US011333013B2

(12) United States Patent
Chang et al.

(10) Patent No.: US 11,333,013 B2
(45) Date of Patent: May 17, 2022

(54) SEGMENTATION OF TIME-FREQUENCY SIGNATURES FOR AUTOMATED PIPE DEFECT DISCRIMINATION

(71) Applicant: HALLIBURTON ENERGY SERVICES, INC., Houston, TX (US)

(72) Inventors: Paul Chin Ling Chang, Cypress, TX (US); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 847 days.

(21) Appl. No.: 16/062,023

(22) PCT Filed: Dec. 28, 2016

(86) PCT No.: PCT/US2016/068952
§ 371 (c)(1),
(2) Date: Jun. 13, 2018

(87) PCT Pub. No.: WO2018/125095
PCT Pub. Date: Jul. 5, 2018

(65) Prior Publication Data
US 2021/0199000 A1 Jul. 1, 2021

(51) Int. Cl.
*E21B 47/00* (2012.01)
*G01V 3/34* (2006.01)
(Continued)

(52) U.S. Cl.
CPC ............ *E21B 47/0025* (2020.05); *G01V 3/34* (2013.01); *G01V 3/38* (2013.01); *E21B 2200/20* (2020.05)

(58) Field of Classification Search
CPC ... E21B 47/0025; E21B 2200/20; G01V 3/34; G01V 3/38
See application file for complete search history.

(56) References Cited

U.S. PATENT DOCUMENTS 3,087,546 A * 4/1963 Woolley ................. E21B 29/00
166/277
4,290,308 A * 9/1981 Dau ........................ G01N 29/11
73/602
(Continued)

FOREIGN PATENT DOCUMENTS

WO      2015131016 A1    9/2015
WO   WO 2015/157270    * 10/2015
(Continued)

OTHER PUBLICATIONS

International Search Report and Written Opinion; PCT Application No. PCT/US2016/068952; dated Dec. 28, 2016.
(Continued)

*Primary Examiner* — Alexander Satanovsky
*Assistant Examiner* — Lynda Dinh
(74) *Attorney, Agent, or Firm* — Polsinelli PC

(57) ABSTRACT

A method for taking measurements in a wellbore including lowering a downhole logging tool in the wellbore; obtaining, via the logging tool, a plurality measurements of a downhole element; processing the plurality of measurements to obtain a plurality of processed measurements; calculating a contour model based on the plurality of processed measurements; and determining a parameter of the downhole element based on the contour model.

15 Claims, 20 Drawing Sheets

(51) Int. Cl.
*G01V 3/38* (2006.01)
*E21B 47/002* (2012.01)

(56) References Cited

U.S. PATENT DOCUMENTS

| | | | |
|---|---|---|---|
| 4,292,589 A | 9/1981 | Bonner | |
| 5,385,049 A | 1/1995 | Hunt et al. | |
| 6,131,659 A * | 10/2000 | Johnson | E21B 47/00 |
| | | | 166/250.05 |
| 7,595,636 B2 | 9/2009 | Barolak et al. | |
| 9,194,183 B2 * | 11/2015 | Stacy, II | E21B 44/00 |
| 2015/0108339 A1 * | 4/2015 | Guo | G01V 5/045 |
| | | | 250/269.6 |
| 2015/0160101 A1 * | 6/2015 | Gao | E21B 41/00 |
| | | | 702/6 |
| 2015/0240627 A1 * | 8/2015 | Gao | G01V 3/26 |
| | | | 422/82.02 |
| 2015/0377012 A1 | 12/2015 | Liu et al. | |
| 2016/0109610 A1 * | 4/2016 | Donderici | E21B 47/00 |
| | | | 324/333 |
| 2016/0161627 A1 * | 6/2016 | Khalaj Amineh | E21B 12/02 |
| | | | 702/6 |
| 2016/0162614 A1 | 6/2016 | Pelivanov et al. | |
| 2016/0290122 A1 | 10/2016 | San Martin et al. | |
| 2017/0010382 A1 * | 1/2017 | Mishkhes | G01N 17/04 |

FOREIGN PATENT DOCUMENTS

| | | |
|---|---|---|
| WO | 2016016186 A1 | 2/2016 |
| WO | 2017082874 A1 | 5/2017 |

OTHER PUBLICATIONS

M. Rourke, Y. Li, and G. Roberts, 2013, Multi-Tubular Corrosion Inspection Using a Pulsed Eddy Current Logging Tool: IPTC 16645.

M. Kass, A. Witkin, and D. Terzopoulos, "Snakes: Active Contour Models," Int. J Comput. Vis., vol. 1, No. 4, pp. 321-331, Jan. 1987.

V. Caselies, R. Kimmel, and G. Sapiro, "Geodesic Active Contours," Int. I Comput. Vis., vol. 22, No. 1, pp. 61-79, Feb. 1997.

C. Li, C. Xu, C. Gui, and M. Fox, "Distance regularized level set evolution and its application to image segmentation," IEEE Trans. Image Process., vol. 19, No. 12, pp. 3243-3254, Dec. 2010.

Examination Report for British application No. GB1905462.6, dated Apr. 16, 2021, 2 pages.

* cited by examiner

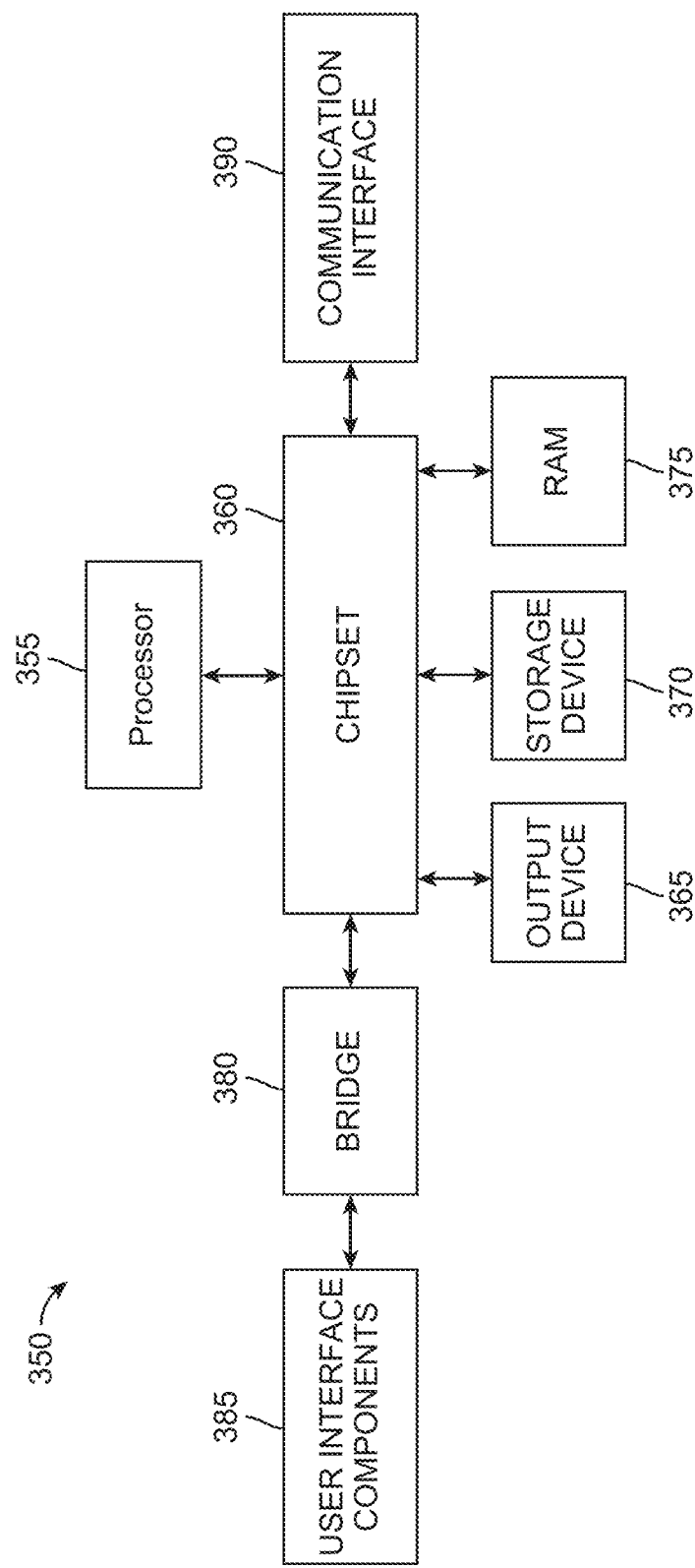

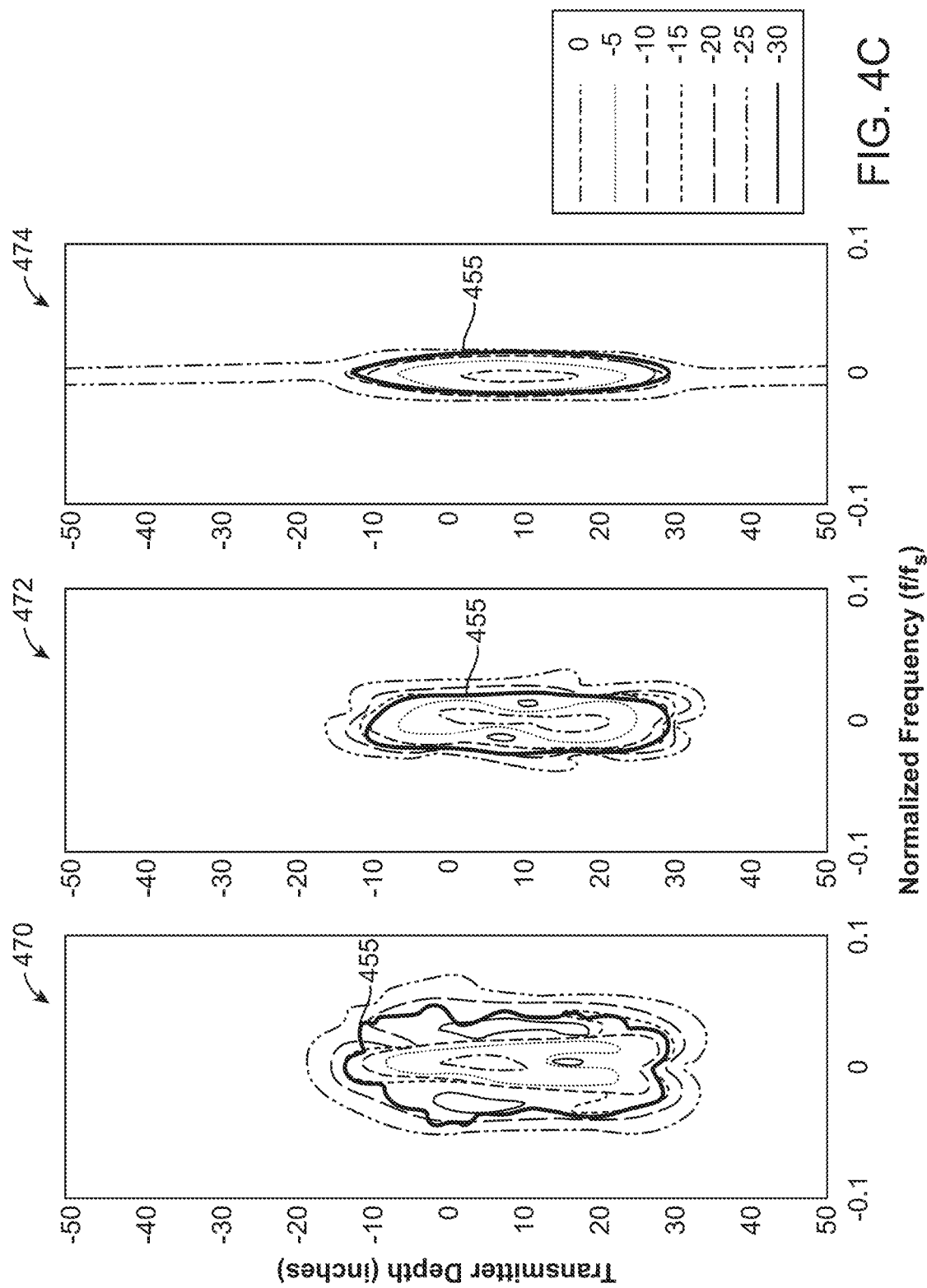

SEGMENTATION OF TIME-FREQUENCY SIGNATURES FOR AUTOMATED PIPE DEFECT DISCRIMINATION

CROSS-REFERENCE TO RELATED APPLICATIONS

This application is a national stage entry of PCT/US2016/068952 filed Dec. 28, 2016, said application is expressly incorporated herein in its entirety.

FIELD

The present disclosure relates generally to methods of processing and interpreting electromagnetic (EM) based data. In particular, the subject matter herein generally relates to inspection and monitoring of downhole oil pipe corrosion.

BACKGROUND

Wellbores are drilled into the earth for a variety of purposes including tapping into hydrocarbon bearing formations to extract the hydrocarbons for use as fuel, lubricants, chemical production, and other purposes. The drilled wellbore is completed by cementing a string of metal pipes connected end-to-end within the wellbore, commonly called "casing" or a "casing string." Casing increases the integrity of the wellbore, inhibits formation fluids from infiltrating the wellbore and prevents produced fluids from migrating into adjacent formations. Some wellbore installations include multiple concentric casing strings secured in the wellbore, each having a smaller diameter, in order to facilitate drilling, completion, production, and enhanced recovery operations.

During the lifetime of the well, the casing may be subject to corrosion that may affect the structural integrity of the casing string. Accordingly, the accurate and effective downhole monitoring of the casing corrosion may be useful in preventing and mitigating pipe integrity failures. Effective monitoring in wellbores having multiple concentric casings is especially challenging since the outermost casing pipe must be monitored from within the innermost pipe. Pipe failure can cause inefficient well operation, leaks at various points, a cross-flow of production, and major safety concerns, all of which can result in the temporary or permanent shutdown of a well. A variety of tools are currently used to inspect and to attempt to monitor the integrity of downhole pipes. Typically these tools can be deployed via wireline and can include, but are not limited to, magnetic flux leakage (MFC) and eddy current (EC).

When inspecting using eddy current measurements two tools are typically used, a time domain tool and a frequency domain tool. Time domain tools typically provide information across a broader band, whereas frequency domain tools are advantageous in exploiting any frequency-specific characteristics of the pipes. Once measurements are taken, the results are viewed and a defect determination is made based on workers' eyeball judgment. The workers additionally attempt to determine the extent and locations of the possible defect based on the measurements, and compare these assumptions with later measurements in attempt to track pipe corrosion.

BRIEF DESCRIPTION OF THE DRAWINGS

Implementations of the present technology will now be described, by way of example only, with reference to the attached figures, wherein:

FIG. 3B is an illustration depicting a computer system having a chipset architecture, according to an exemplary embodiment;

FIG. 4C is a geometric segmentation of the three pipe arrangement of FIG. 4A;

DETAILED DESCRIPTION

Figure 1:
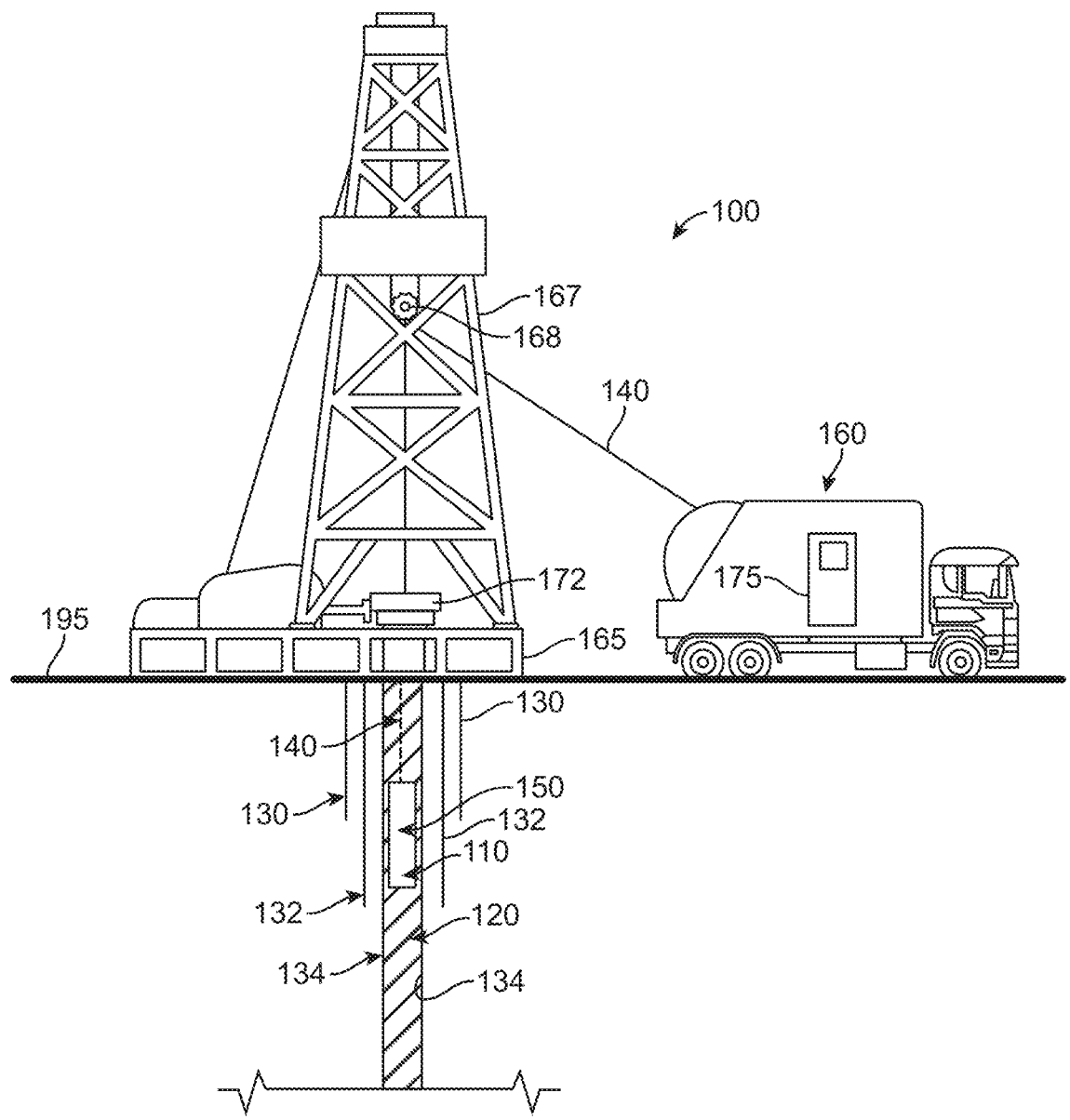
FIG. 1 is a diagram of a wellbore operating environment in which an apparatus, method, and system, having a downhole logging tool, may be deployed, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, reference to up or down is made for purposes of description with "up," "upper," "upward," or "uphole" meaning toward the surface of the wellbore and with "down," "lower," "downward," or "downhole" meaning toward the terminal end of the well, regardless of the wellbore orientation. Correspondingly, the transverse, axial, lateral, longitudinal, radial, etc., orientations shall mean orientations relative to the orientation of the wellbore or tool.

Several definitions that apply throughout the above disclosure will now be presented. The term "coupled" is defined as connected, whether directly or indirectly through intervening components, and is not necessarily limited to physical connections. The connection can be such that the objects are permanently connected or releasably connected. The term "outside," "outer," or "external" refers to a region that is beyond the outermost confines of a physical object. The term "inside," "inner," or "internal" refers to a region that is within the outermost confines of a physical object. The terms "comprising," "including" and "having" are used interchangeably in this disclosure. The terms "comprising," "including" and "having" mean to include, but not necessarily be limited to the things so described.

Disclosed herein is a method for determining attributes of a downhole element such as a pipe defect. The method involves taking measurements throughout the length of a wellbore by lowering a downhole logging tool in the wellbore and obtaining a plurality measurements of one or more downhole elements. The plurality of measurements is processed to obtain a plurality of processed measurements which can be represented in a spectrogram. These plurality of processed measurements are then used to calculate a contour model. The contour model serves as a basis to determine a parameter of the downhole element. The above described method allows for automatic quantification of defect signatures within a spectrogram by segmenting the spectrogram to represent a target area by a geometric active contour, thereby allowing attributes relevant to certain pipe defects, for example, contour length and width, to be extracted.

FIG. 1 illustrates a diagrammatic view of a wellbore operating environment 100 in which an apparatus, method, and system, having a downhole logging tool 110, may be deployed in accordance with certain exemplary embodiments of the present disclosure. The wellbore operating environment 100 includes a drilling platform 165 equipped with a derrick 167 that supports a hoist 168. Drilling oil and gas wells is commonly carried out using a string of drill pipes connected together so as to form a drilling string that is lowered through a rotary table 172 into a wellbore 120. During drilling operations, casing is installed in the drilled wellbore by cementing a string of metal pipes connected end-to-end within the wellbore. As depicted in FIG. 1, wellbore 120 comprises multiple concentric casing strings, or pipes 130, 132, 134, secured in the wellbore. Each pipe has a smaller diameter, with the outer pipe 130 having the largest diameter, the middle pipe 132 having the next largest diameter, and the inner pipe 134 having the smallest diameter. As depicted in FIG. 1, the inner pipe 134 forms the wall of wellbore 120. In at least some instances, the inner pipe 134 may be, for example, a production casing or production tubing through which hydrocarbons from produced formations may be received at the surface 195, as shown in detail in FIG. 2.

Figure 2:
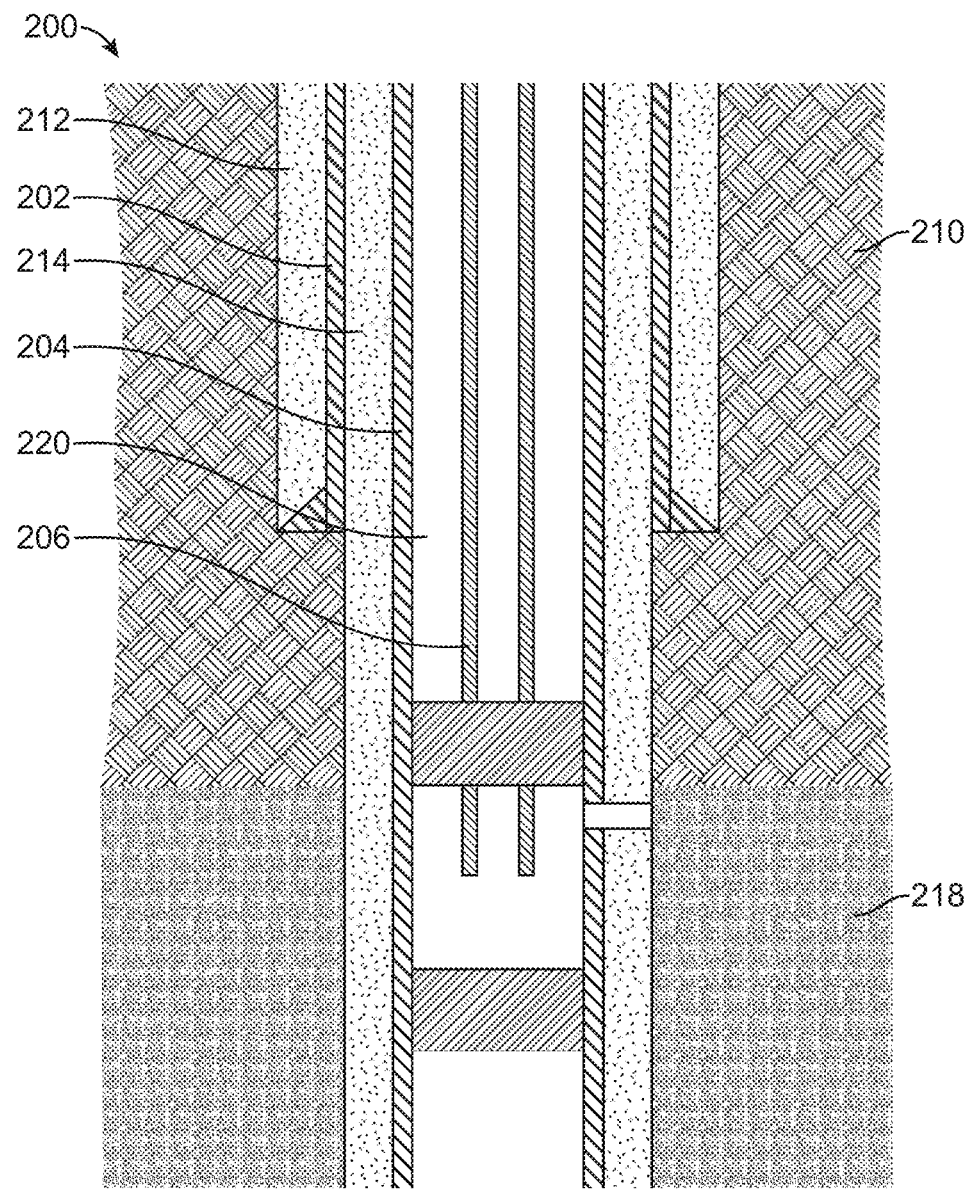
FIG. 2 is a diagram of a production environment having multiple concentric casings in which an apparatus, method and system, having a downhole logging tool may be deployed, according to an exemplary embodiment.

FIG. 2 illustrates a diagrammatic view of a production environment 200 having multiple concentric pipes in which an apparatus, method, and system, having a downhole logging tool, may be deployed, in accordance with exemplary embodiments of the present disclosure. The production environment 200 includes concentric pipes 202, 204 disposed within wellbore 220 that has been drilled through rock formations 210, 218. Outer pipe 202 is secured within wellbore 220 through cement layer 212. Inner pipe 204 is secured within wellbore 220 and outer pipe 202 through cement layer 214. As depicted in FIG. 2, the production environment 200 further includes production tubing 206 through which hydrocarbons from produced formation 218 may flow to the surface. Therefore, inner pipe 204 may serve as a production casing.

Referring back to FIG. 1, some or all of the drill string has been removed from the wellbore 120 to allow a downhole logging tool 110 to be lowered into the wellbore 120. The downhole logging tool 110 may be conveyed in the wellbore 120 by any conveyance 140 including, but not limited to, wireline, logging cable, slickline, tubing, coiled tubing, pipe, metallic wire, non-metallic wire, or composite wire. Although not depicted as such, in one or more embodiments, the electromagnetic (EM) logging tool 110 may be part of a bottom hole assembly (BHA) of a logging while drilling tool. Typically, the downhole logging tool 110 is lowered into the wellbore 120 and subsequently used to perform operations adjacent to one or more pipes or pipe features of interest, such as pipes 130, 132, 134.

As depicted in FIG. 1, the downhole logging tool 110 may include one or more transmitter coils and receiver coils, as well as data acquisition electronics, to implement the response measurements described herein. The transmitter coil and receiver coil can be spaced at varying distances such that a plurality of measurements can be taken. The downhole logging tool 110 may additionally include one or more additional logging tools for casing evaluation or formation evaluation. The downhole logging tool 110 may be communicatively coupled with a control or processing facility 160 at the surface 195. While the control or processing facility 160 is depicted in FIG. 1 as a truck, the control or processing facility 160 may be any structure without departing form the spirit and scope of the present disclosure. In at least some instances, the downhole logging tool 110 may also receive power from the control or processing facility 160. In other cases, the downhole logging tool 110 receives power from a downhole power sources, such as a battery.

The control or processing facility 160 may include at least one computer system 175 communicatively coupled with the downhole logging tool 110. The computer system 175 may be capable of sending and receiving control signals and/or telemetry data to and from the downhole logging tool 110. The computer system 175 may be further capable of obtaining the measured responses from the downhole logging tool 110 and implementing the methods described herein. The control or processing facility 160 and/or the computer system 175 may be located at the surface 195 adjacent to the wellbore 120, as depicted in FIG. 1, or may be located at a remote location. In at least some instances, the methods described herein may be implemented on a computer system 175 not communicatively coupled with the downhole logging tool, without departing from the spirit and scope of the present disclosure, as long as the computer system is capable of obtaining the measured responses acquired by the downhole logging tool 110.

In at least some instances, downhole logging tool 110 may include at least one downhole computing device 150. In such instances, the downhole computing device 150 is in communication with the control or processing facility 160 and/or the computer system 175 via one or more communication lines. The communication lines may be any wired or wireless means of telecommunication between two locations and may include, but is not limited to, electrical lines, fiber optic lines, radio frequency transmission, electromagnetic telemetry, and acoustic telemetry. In at least some instances, downhole computing device 150 is capable of implementing the methods described herein.

Modifications, additions, or omissions may be made to FIG. 1 without departing from the spirit and scope of the present disclosure. For example, FIG. 1 depicts components of the wellbore operating environment 100 in a particular configuration. However, any suitable configuration of components for logging a wellbore may be used. Furthermore, fewer components or additional components beyond those illustrated may be included in the wellbore operating environment 100 without departing from the spirit and scope of the present disclosure. It should be noted that while FIG. 1 generally depicts a land-based operation, those skilled in the art would readily recognize that the principles described herein are equally applicable to operations that employ floating or sea-based platforms and rigs, without departing from the scope of the disclosure. Also, even though FIG. 1 depicts a vertical wellbore, the present disclosure is equally well-suited for use in wellbores having other orientations, including horizontal wellbores, slanted wellbores, multilateral wellbores or the like.

Figure 3A:
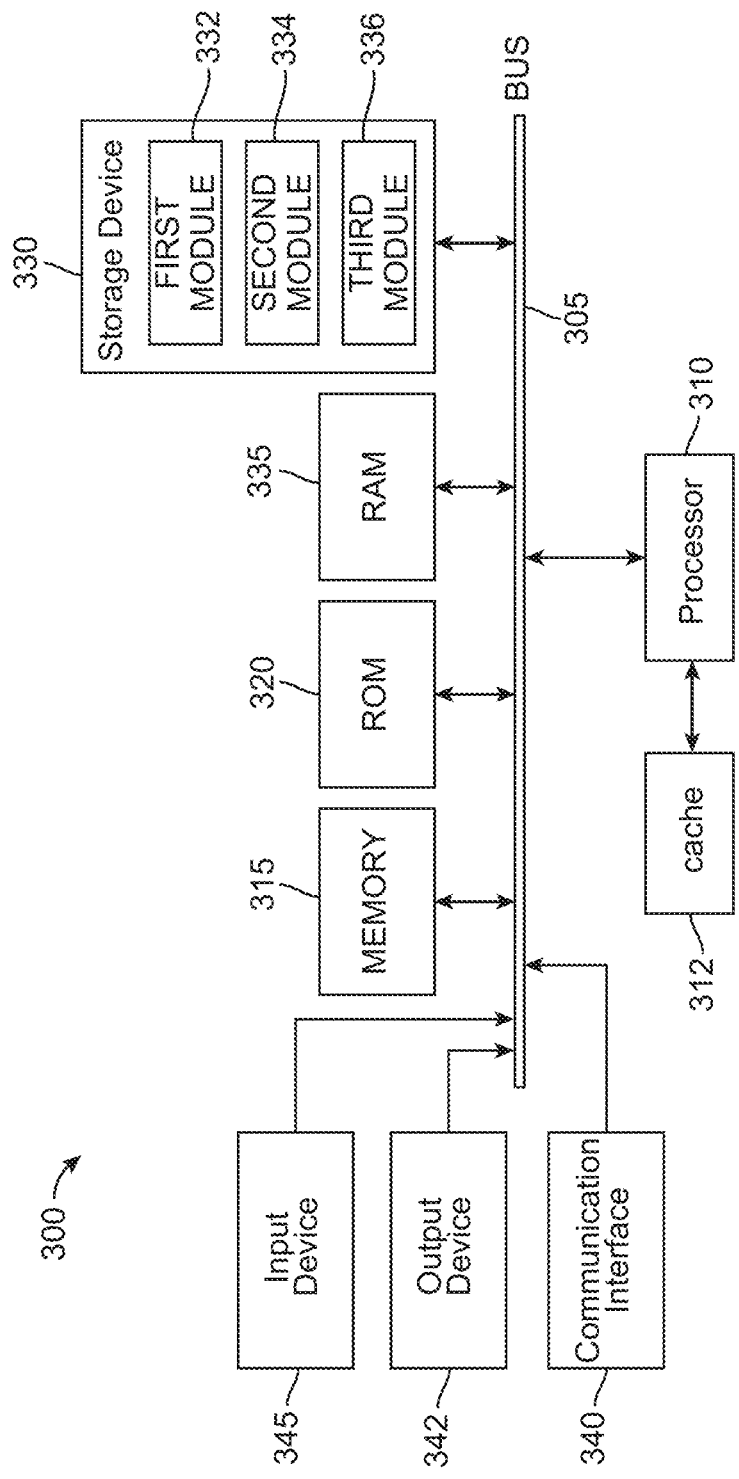
FIG. 3A is an illustration depicting a conventional system bus computing system architecture, according to an exemplary embodiment.

Computer system 175 and downhole computing device 150 may include any suitable computer, controller, or data processing apparatus capable of being programmed to carry out the method, system, and apparatus as further described herein. FIGS. 3A and 3B illustrate exemplary computer system 175 and computing device 150 embodiments which can be employed to practice the concepts, methods, and techniques disclosed herein. The more appropriate embodiment will be apparent to those of ordinary skill in the art when practicing the present technology. Persons of ordinary skill in the art will also readily appreciate that other system embodiments are possible.

FIG. 3A illustrates a conventional system bus computing system architecture 300 wherein the components of the system are in electrical communication with each other using a bus 305. System 300 can include a processing unit (CPU or processor) 310 and a system bus 305 that couples various system components including the system memory 315, such as read only memory (ROM) 320 and random access memory (RAM) 335, to the processor 310. The system 300 can include a cache of high-speed memory connected directly with, in close proximity to, or integrated as part of the processor 310. The system 300 can copy data from the memory 315 and/or the storage device 330 to the cache 312 for quick access by the processor 310. In this way, the cache 312 can provide a performance boost that avoids processor 310 delays while waiting for data. These and other modules can control or be configured to control the processor 310 to perform various actions. Other system memory 315 may be available for use as well. The memory 315 can include multiple different types of memory with different performance characteristics. It can be appreciated that the disclosure may operate on a computing device 300 with more than one processor 310 or on a group or cluster of computing devices networked together to provide greater processing capability. The processor 310 can include any general purpose processor and a hardware module or software module, such as first module 332, second module 334, and third module 336 stored in storage device 330, configured to control the processor 310 as well as a special-purpose processor where software instructions are incorporated into the actual processor design. The processor 310 may essentially be a completely self-contained computing system, containing multiple cores or processors, a bus, memory controller, cache, etc. A multi-core processor may be symmetric or asymmetric.

The system bus 305 may be any of several types of bus structures including a memory bus or a memory controller, a peripheral bus, and a local bus using any of a variety of bus architectures. A basic input/output (BIOS) stored in ROM 320 or the like, may provide the basic routine that helps to transfer information between elements within the computing device 300, such as during start-up. The computing device 300 further includes storage devices 330 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 330 can include software modules 332, 334, 336 for controlling the processor 310. The system 300 can include other hardware or software modules. The storage device 330 is connected to the system bus 305 by a drive interface. The drives and the associated computer-readable storage devices provide non-volatile storage of computer-readable instructions, data structures, program modules and other data for the computing device 300. In one aspect, a hardware module that performs a particular function includes the software components shorted in a tangible computer-readable storage device in connection with the necessary hardware components, such as the processor 310, bus 305, and so forth, to carry out a particular function. In the alternative, the system can use a processor and computer-readable storage device to store instructions which, when executed by the processor, cause the processor to perform operations, a method or other specific actions. The basic components and appropriate variations can be modified depending on the type of device, such as whether the device 300 is a small, handheld computing device, a desktop computer, or a computer server. When the processor 310 executes instructions to perform "operations", the processor 310 can perform the operations directly and/or facilitate, direct, or cooperate with another device or component to perform the operations.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 342 can also be one or more of a number of output mechanisms known to those of skill in the art. In some instances, multimodal systems can enable a user to provide multiple types of input to communicate with the computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks (DVDs), cartridges, RAMs 325, ROM 320, a cable containing a bit stream, and hybrids thereof.

The logical operations for carrying out the disclosure herein may include: (1) a sequence of computer implemented steps, operations, or procedures running on a programmable circuit with a general use computer, (2) a sequence of computer implemented steps, operations, or procedures running on a specific-use programmable circuit; and/or (3) interconnected machine modules or program engines within the programmable circuits. The system 300 shown in FIG. 3A can practice all or part of the recited methods, can be a part of the recited systems, and/or can operate according to instructions in the recited tangible computer-readable storage devices.

One or more parts of the example computing device 300, up to and including the entire computing device 300, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 310 can include all types of processors disclosed herein, including a virtual processor. However, when referring to a virtual processor, the processor 310 includes the software components associated with executing the virtual processor in a virtualization layer and underlying hardware necessary to execute the virtualization layer. The system 300 can include a physical or virtual processor 310 that receives instructions stored in a computer-readable storage device, which causes the processor 310 to perform certain operations. When referring to a virtual processor 310, the system also includes the underlying physical hardware executing the virtual processor 310.

FIG. 3B illustrates an example computer system 350 having a chipset architecture that can be used in executing the described method and generating and displaying a graphical user interface (GUI). Computer system 350 can be computer hardware, software, and firmware that can be used to implement the disclosed technology. System 350 can include a processor 355, representative of any number of physically and/or logically distinct resources capable of executing software, firmware, and hardware configured to perform identified computations. Processor 355 can communicate with a chipset 360 that can control input to and output from processor 355. Chipset 360 can output information to output device 365, such as a display, and can read and write information to storage device 370, which can include magnetic media, and solid state media. Chipset 360 can also read data from and write data to RAM 375. A bridge 380 for interfacing with a variety of user interface components 385 can include a keyboard, a microphone, touch detection and processing circuitry, a pointing device, such as a mouse, and so on. In general, inputs to system 350 can come from any of a variety of sources, machine generated and/or human generated.

Chipset 360 can also interface with one or more communication interfaces 390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 355 analyzing data stored in storage 370 or RAM 375. Further, the machine can receive inputs from a user via user interface components 385 and execute appropriate functions, such as browsing functions by interpreting these inputs using processor 355.

It can be appreciated that systems 300 and 350 can have more than one processor 310, 355 or be part of a group or cluster of computing devices networked together to provide processing capability. For example, the processor 310, 355 can include multiple processors, such as a system having multiple, physically separate processors in different sockets, or a system having multiple processor cores on a single physical chip. Similarly, the processor 310 can include multiple distributed processors located in multiple separate computing devices, but working together such as via a communications network. Multiple processors or processor cores can share resources such as memory 315 or the cache 312, or can operate using independent resources. The processor 310 can include one or more of a state machine, an application specific integrated circuit (ASIC), or a programmable gate array (PGA) including a field PGA.

Methods according to the aforementioned description can be implemented using computer-executable instructions that are stored or otherwise available from computer readable media. Such instructions can comprise instructions and data which cause or otherwise configured a general purpose computer, special purpose computer, or special purpose processing device to perform a certain function or group of functions. portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software. The functions these blocks represent may be provided through the use of either shared or dedicated hardware, including, but not limited to, hardware capable of executing software and hardware, such as a processor 310, that is purpose-built to operate as an equivalent to software executing on a general purpose processor. For example, the functions of one or more processors represented in FIG. 3A may be provided by a single shared processor or multiple processors. (use of the term "processor" should not be construed to refer exclusively to hardware capable of executing software.) Illustrative embodiments may include microprocessor and/or digital signal processor (DSP) hardware, ROM 320 for storing software performing the operations described below, and RAM 335 for storing results. Very large scale integration (VLSI) hardware embodiments, as well as custom VLSI circuitry in combination with a general purpose DSP circuit, may also be provided.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in the present disclosure.

Figure 4A:
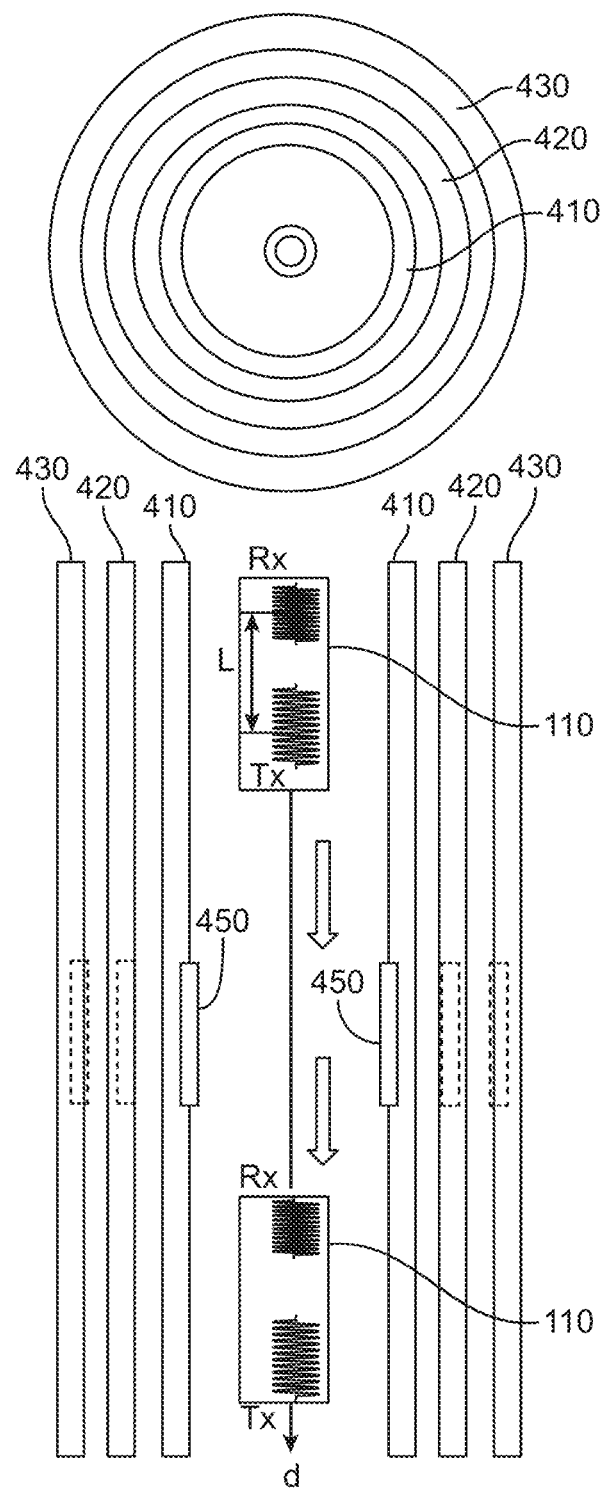
FIG. 4A is diagram of a three pipe arrangement within a wellbore.

Downhole elements, such as pipe defects, can be evaluated in a several different ways. For example, a plurality of measurements can be taken in multiple domains for a better understanding of the parameter; the domains can include, but are not limited to, a depth-frequency domain, a time-frequency domain, a borehole azimuth-depth domain, and a depth-time domain. For the purposes of this example, the measurements taken are in the time-frequency domain. In order to characterize the time-frequency signature of a defect within a pipe, frequency-domain electromagnetic simulations can be carried out. These plurality of measurements can be taken in, for example, a wellbore containing three pipes, as shown in FIG. 4A. FIG. 4A illustrates an example wellbore with three concentric pipes, or casings, an inner pipe 410, a middle pipe 420, and an outer pipe 430. Also shown, is a diagram of how the measurements are taken. A downhole logging tool 110 is disposed within the inner pipe 410 and moved slowly throughout the length of the wellbore. The downhole logging tool 110 can contain for example a transmitting coil and a receiving coil. In particular, electric and magnetic field (EMF) voltages were simulated at the receiver coil as the downhole logging tool 110 gradually moves past a defect 450 centered at d=0 inch. The distance L between the transmitter coil (Tx) and the receiver coil (Rx) can be adjusted to allow for a more detailed analysis of the defect 450. Once plurality of measurements are taken as shown in FIG. 4A, these can be processed to obtain a plurality of processed measurements capable of quantifying a downhole element. The processed measurements can be used to produce a visual display, for example generating a spectrogram. The downhole element can be, but is not limited to, a pipe or an earth formation.

Figure 4B:
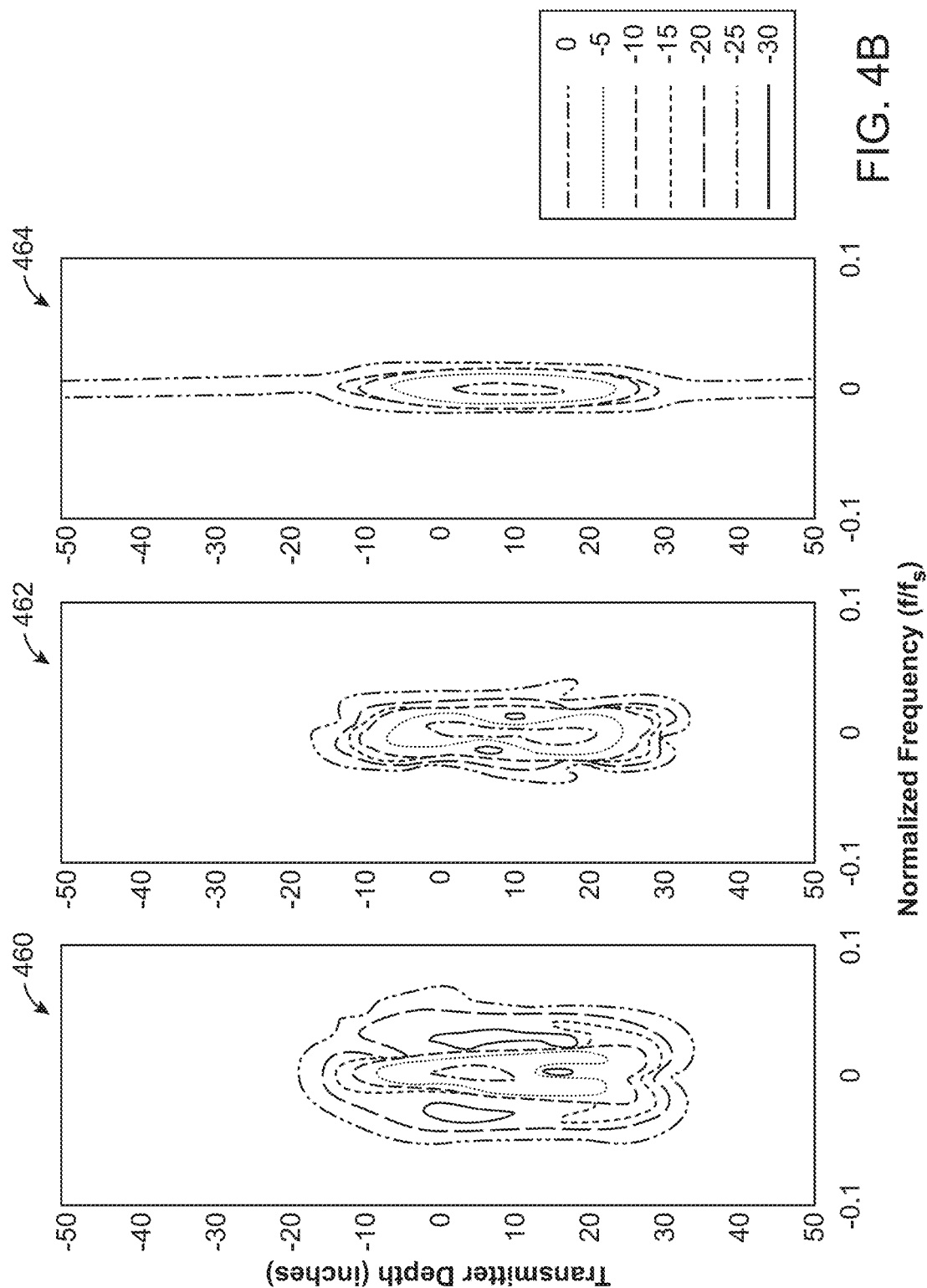
FIG. 4B is a time-frequency spectrogram of the three pipe arrangement of FIG. 4A.

For instance, while the defect 450 can only be visually detected in pipe 410 of FIG. 4A, the defect has actually expanded into the middle and outer pipes 420, 430, as shown in the spectrograms provided in FIGS. 4B-4E. For the purposes of this example, following variables are maintained throughout FIGS. 4B-4E, frequency was set at 2 Hz, the length of the defect 450 ($t$) was assumed to be 10 inches, the defect thickness was 0.3 inches, ODs were [2+⅞, 4+½, 9+⅝], and pipe permeability was set at 50. After measurements are taken, a time-frequency analysis can be applied to characterize the local frequency content of the simulated voltages at different transmitter depths. This analysis allows for better quantify signal variation (frequency spread) as the tool scans along the pipe. The measurements represented in FIGS. 4B and 4C were taken at varying transmitter-receiver distances, the data in graph 460 was taken at a transmitter-receiver distance (L) of 10, 462 was taken at an L of 20, and 464 was taken at an L of 30. FIG. 4B illustrates three time frequency spectrograms of the defect 450 in pipe 420 at each of the previously stated transmitter-receiver distances. FIG. 4C illustrates a plurality of geometric segmentation graphs taken at similar transmitter-receiver distances. Specifically, the data shown in graph 470 was taken at L=10, 472 was taken at L=20, and 474 was taken at L=30. Each of the geometric segmentation graphs 470, 472, 474 shows the boundaries 455 of the defect 450, which is highlighted by the geometric segmentation process.

A windowing function, for example hamming, of a finite size, centered at a given transmitter depth, can be applied to the received voltage signal and a discrete Fourier transform (DFT) can be carried out. The process can be repeated as the window moves along all transmitter depths. This technique, Short Time Fourier transform (STFT), can produce the time-frequency spectrogram, shown in FIG. 4B.

The resulting spectrograms of the above simulations are shown in FIGS. 4B-4E. In order to observe more clearly the smaller frequency spread near the zero frequency axis, voltage values of the stationary components (or pipes with no corrosion or defect) were purposely subtracted out from that of the defect-carrying cases. Voltage values of the cases with no defect can be obtained through time-gating and averaging of the existing measurements. Due to imperfections in practical measurements, a 1% subtraction error is assumed for this example in order to collectively represent all measurement inaccuracies in one term. As a result of the assumption, there will always be some remaining amplitude on the zero frequency axis. Depending on the data acquisition rate ($f_s$), the frequency axis of the spectrogram can have a range of $[-f_s/2, f_s/2]$. The data acquisition rate $f_s$, is the ratio between logging speed and sample spacing. For analysis, the frequency axis of the spectrogram has been normalized to the data acquisition rate $f_s$, or their maximum magnitude, allowing defects to show up on pipes with weaker voltage signals, as is the case for defects in the middle and outer pipes 420, 430.

Figure 4D:
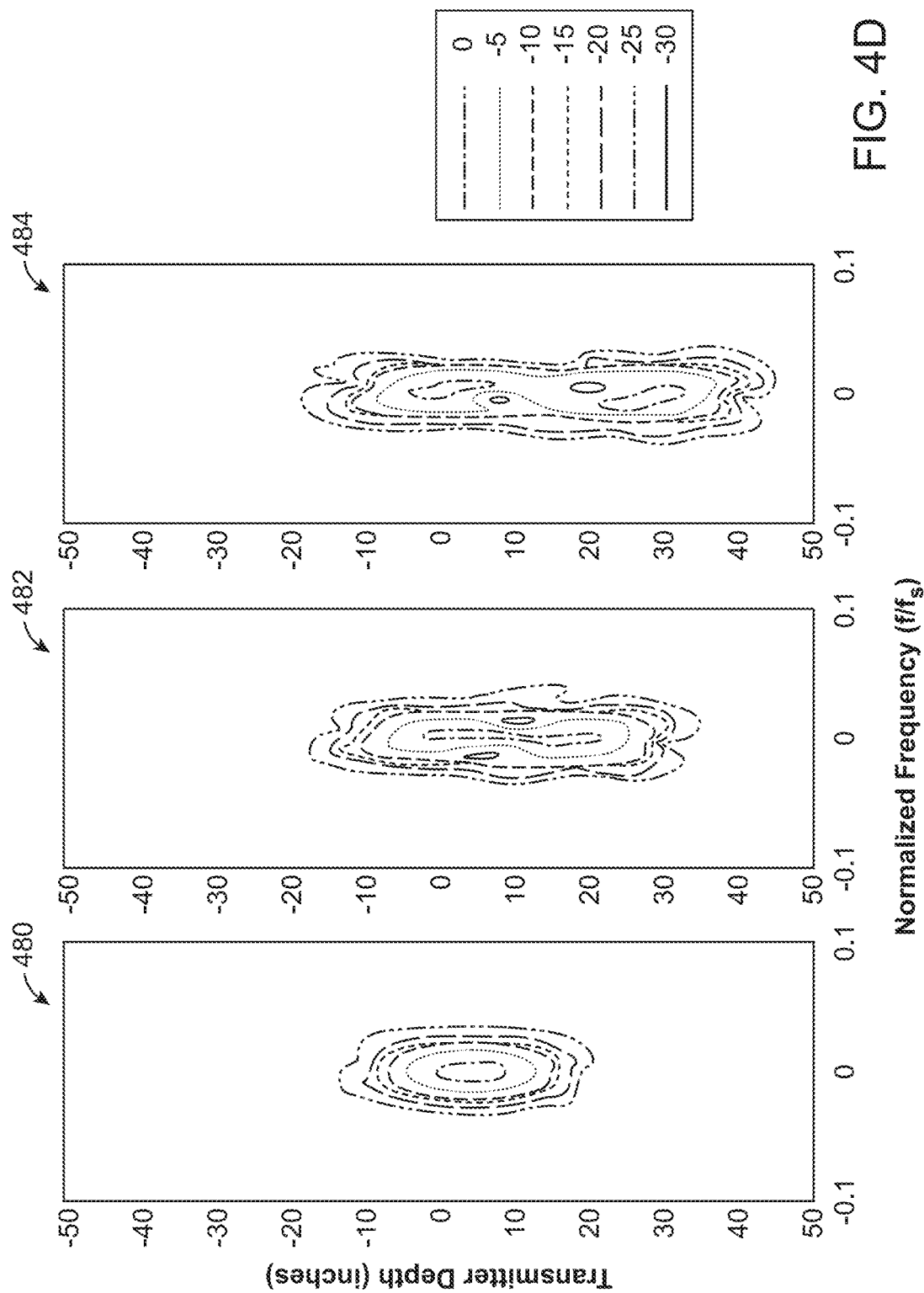
FIG. 4D is a time-frequency spectrogram of the three pipe arrangement of FIG. 4A.
Figure 4E:
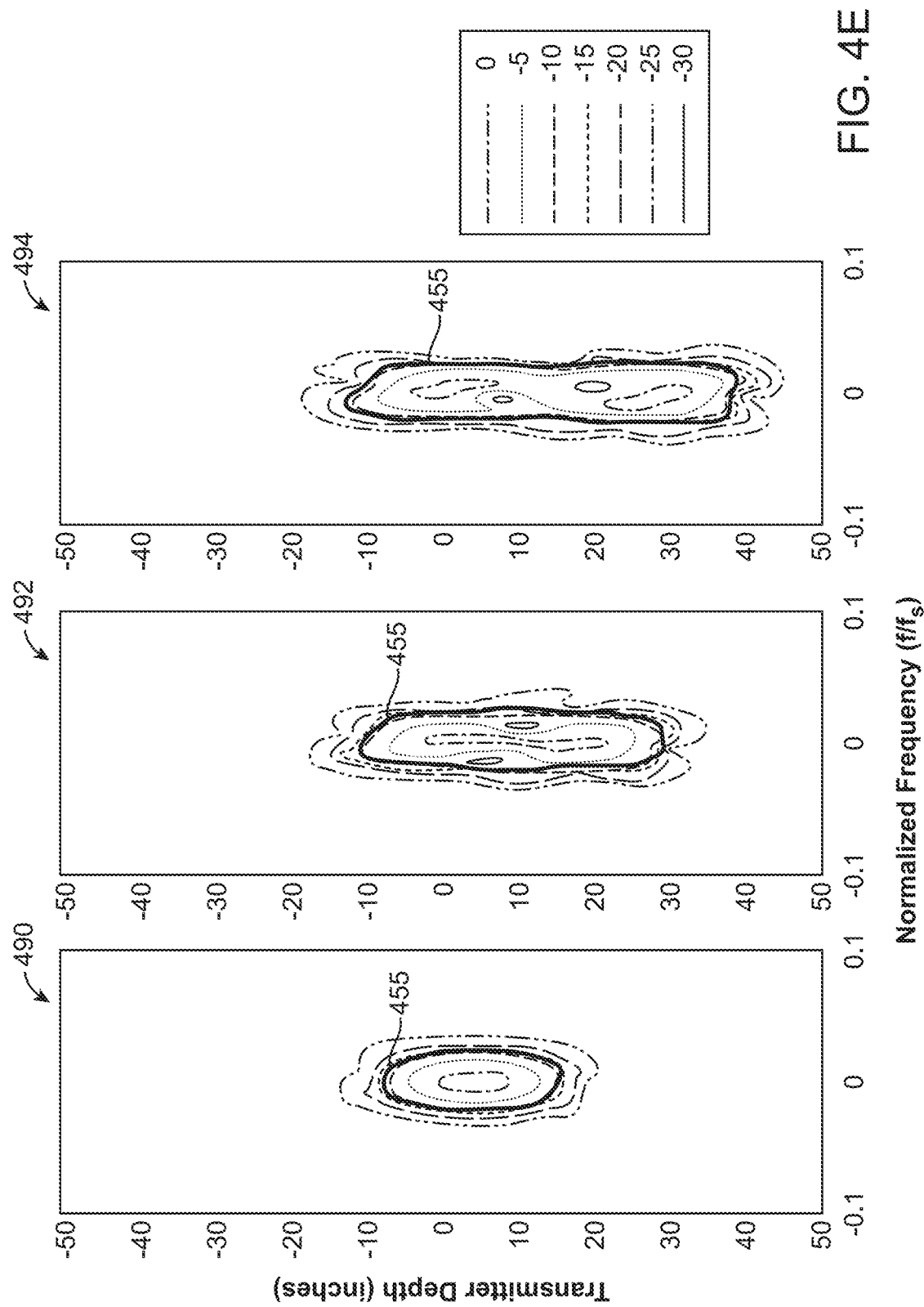
FIG. 4E is a geometric segmentation of the three pipe arrangement of FIG. 4A.

FIG. 4D illustrates a plurality of time-frequency spectrograms for each of three concentric pipes. The data for graph 480 was taken with respect to the defect 450 in the inner pipe 410, the data for graph 482 was taken for the defect 450 in the middle pipe 420, and the data for graph 484 was taken for the defect 450 in the outer pipe 430. The boundaries 455 of the defect 450 are shown in each of the graphs. Similarly, FIG. 4E illustrates a plurality of geometric segmentation graphs of each of the three pipes. The data for graph 490 was taken from the inner pipe 410, the data for graph 492 was taken from the middle pipe 420, and the data for graph 430 was taken from the outer pipe 430, each of the geometric spectrograms highlight the boundaries of the defect 450.

The spectrograms of FIGS. 4D and 4E, illustrate that the width of frequency spread is narrower for the pipe defect in the middle and outer pipes 420, 430. Additionally, the frequency spread remains largely unchanged for variations in defect thickness and transmitter-receiver spacing. Frequency spread is a signature that can reveal information about the radial depth of a pipe defect. It can be expected that induction tools could be more sensitive to conductivity changes at closer radial distances. As the radial distance of the defect increases, vertical resolution can decrease, resulting in fewer high frequency contents in the received voltage signal. Moreover, as the EM fields penetrate additional pipes, smoothing can occur due to propagation through a medium of higher permeability, further reducing any high frequency contents of the voltage outputs. The smoothing can be understood as having a delay due to the higher pipe permeability making the apparent radial distance larger.

The length of the defect (t) is related to the axial span of the non-zero frequency spread, which, additionally, is directly proportional to region of impact between the sensors and the defect length. The region of impact begins as the transmitter passes the defect and ends when the receiver and the defect are no longer overlapping. Therefore when a fixed transmitting and receiving pair are used, a larger defect length corresponds to a larger the non-zero frequency spread in the spectrogram, and vice versa. For example, referring back to the spectrograms of FIGS. 4D and 4E, which show the time-frequency and geometric segmentation, respectively, of the middle pipe 420 wherein the transmitter-receiver spacing is varied from L=10 to L=30. Thus, the length of the non-zero frequency spread can be used as a signature for distinguishing the length of the defect.

Image segmentation algorithms can be applied to label different parts of a spectrogram image. As shown in FIGS. 4B-4E, non-zero frequency contents of the pipe defect can be of any shape. Therefore, the segmentation algorithm needs to be able to handle a variety of geometric variations. FIGS. 4C and 4E illustrate the boundaries 455 of the pipe defect 450 after applying segmentation. Subsequent the generation of spectrograms and segmentation, contour models can be calculated.

Two types of active contour models can be employed: parametric active contours and geometric active contours. Parametric active contours are formulated in terms of dynamic parametric contours C(s, t) with spatial variables s∈[0,1) that parametrizes the points in the contour, and another temporal variable t→[0, ∞). In such cases, the contour evolution can be expressed by Equation 1.

$$\frac{\partial C(s,t)}{\partial t} = FN \tag{1}$$

Wherein F is the force function that controls the contour motion and N is the inward vector normal to the contour C. Rather than parameterizing the contour, the contour evolution of Eqn. 1 may be converted to geometric active contour formulation by embedding C into a level set function (LSF) ϕ(x, y, t), or zero level set. Assuming, for the purposes of this example, the embedded level set function takes negative values inside the contour and positive values outside, the vector N can be expressed as N=−∇ϕ/|∇ϕ|, and Eqn. 1 becomes a level set evolution as Equation 2.

$$\frac{\partial \phi}{\partial t} = F|\nabla \phi| \tag{2}$$

Geometric active contours can be used to represent contours of complex topology and can manage topological changes, including but not limited to, splitting and emerging. Additionally, level set methods can be performed on a fixed Cartesian grid without having to parametrize the points on the contour, as is done in parametric active contour models. When using a level set method to segment pipe defect spectrograms, an edge indicator function (g) must be defined, g must have smaller values at the edge or boundary of an object, where there is a change in contrast. For example, Equation 3 can be used to define an edge indicator function.

$$g = \frac{1}{1+|\nabla G_\sigma * I|^2} \tag{3}$$

Where I is an image to be segmented, and $G_\sigma$ is a Gaussian kernel with a standard deviation of σ. For the purposes of this Example, the convolution in Eqn. 3 is used to smooth the image and reduce noise. The edge indicator function can be built directly into the formulation of the level set contour evaluation, such that the contours will automatically conform to the target edges of the image. In a conventional level set formulation, an evolution equation, as shown in Equation 4, can be used.

$$\frac{\partial \phi}{\partial t} = F|\nabla \phi| + A \cdot \nabla \phi \tag{4}$$

Where F is a scalar function and A is a vector-valued function. In order to incorporate the edge indicator function (g) for detection of object boundaries, a geodesic active contour (GAC) formulation can be used, as shown in Equation 5.

$$\frac{\partial \phi}{\partial t} = g|\nabla \phi|div\left(\frac{\nabla \phi}{|\nabla \phi|}\right) + \nabla g \cdot \nabla \phi + \alpha g|\nabla \phi| \tag{5}$$

Where α is a constant representing the speed function F as shown in Eqn. 4. In level set techniques, the contour of interest is defined and embedded as the zero level set of the LSF (for example, a slice of LSF at ϕ=0 plane). Even though the result of segmentation is only the zero level set, the entire LSF must be in a good condition to produce a stable and numerically accurate contour evolution. To obtain the stable contour evolution, the LSF must be smooth and it must satisfy the unique property of signed distance functions, |∇ϕ|=1. As such, signed distance functions can be used as level set functions in level set methods. For a level set formulation as shown in Eqn. 5, the LSF must be initialized and periodically re-initialized as a signed distance function. In order to avoid manually applying a periodic re-initialization, a distance-regularized let set evolution (DRLSE) can be used, which has a signed distance property built intrinsically into the evolution.

Figure 5A:
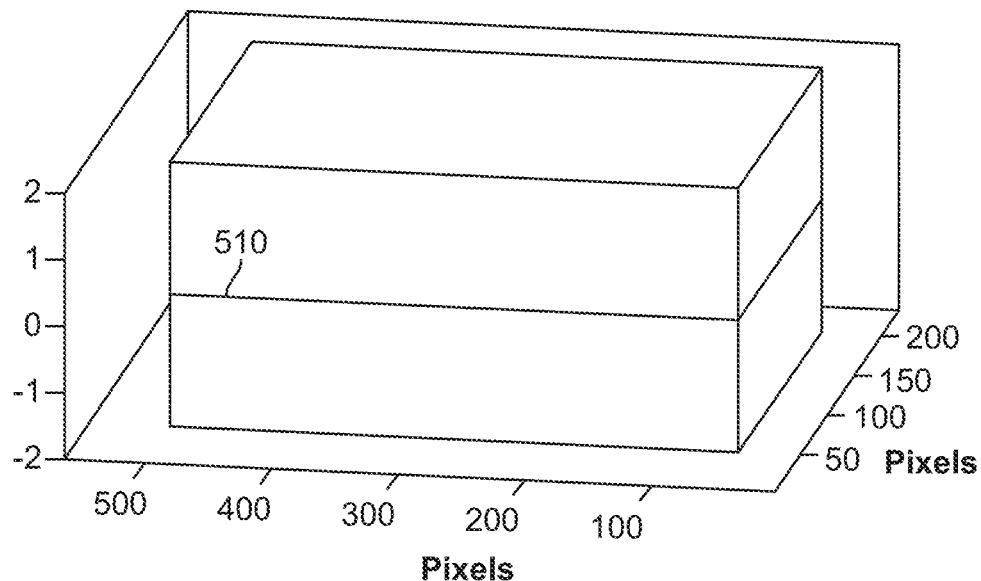
FIG. 5A is a graph of the initial level set function for segmentation of pipe defect signatures of the example in FIG. 4A.
Figure 5B:
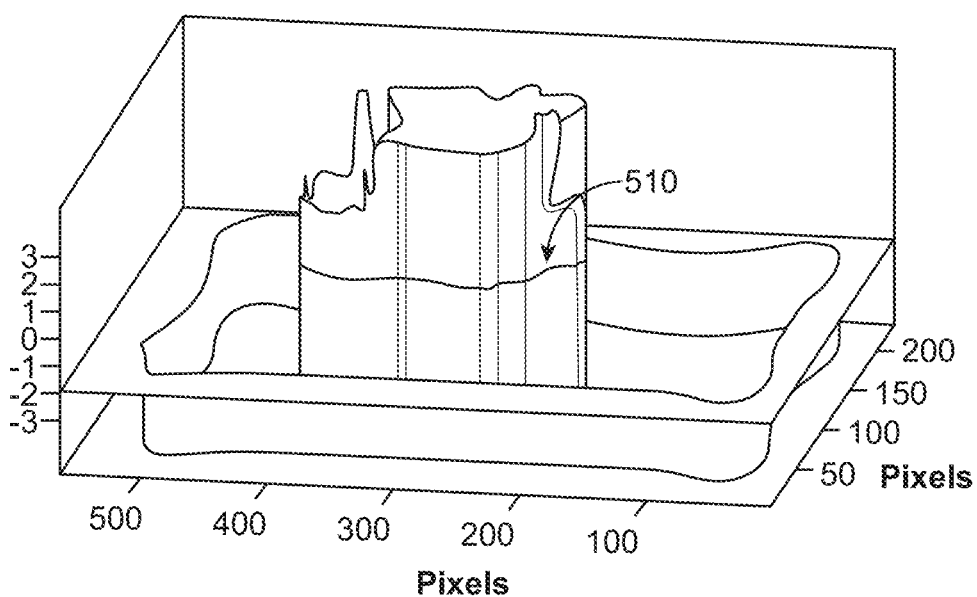
FIG. 5B is a graph of the final level set function for segmentation of pipe defect signatures of the example in FIG. 4A.
Figure 6A:
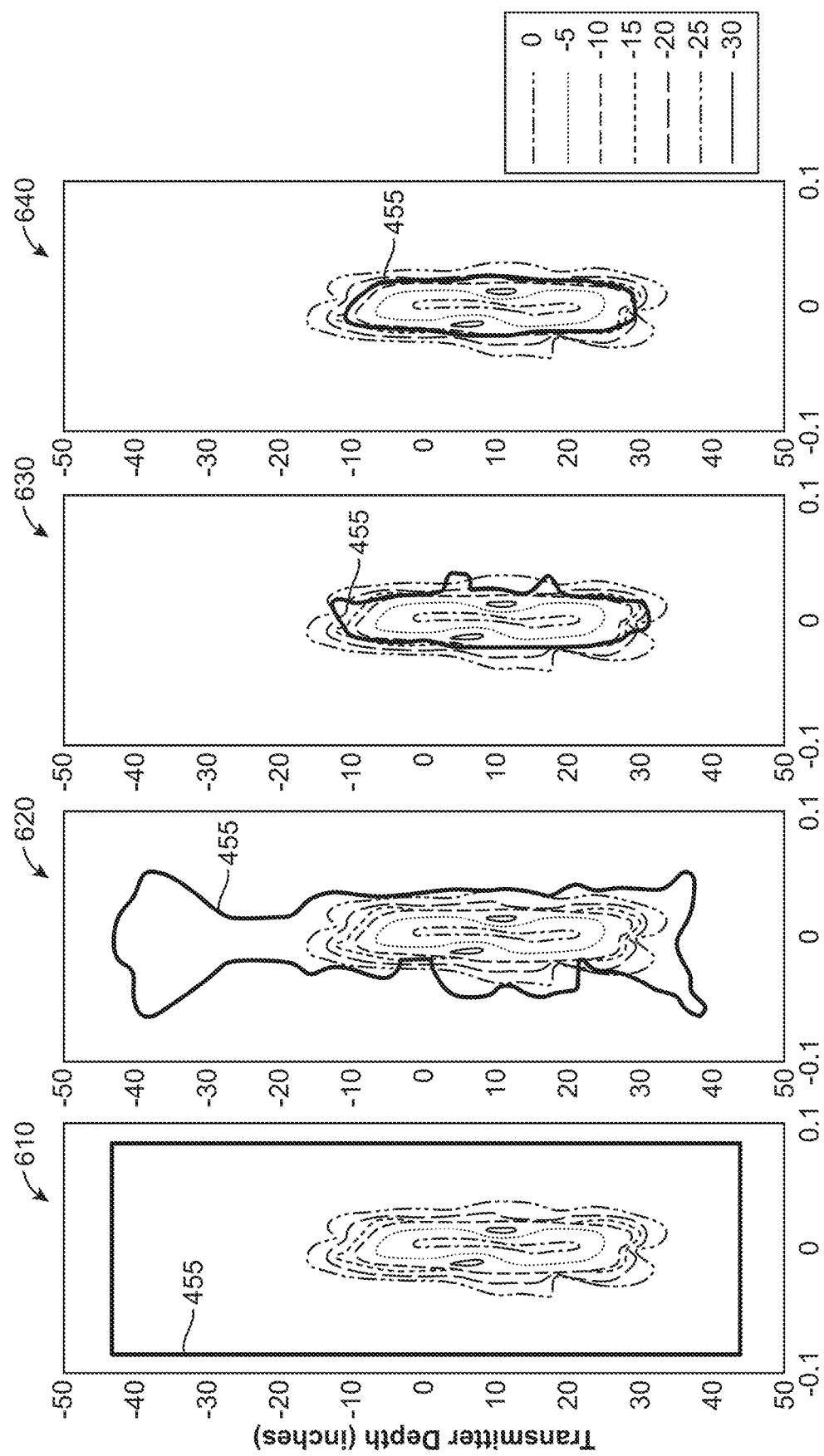
FIG. 6A is a level set contour segmentation of a pipe 320 defect of the three pipe arrangement of FIG. 4A.
Figure 6B:
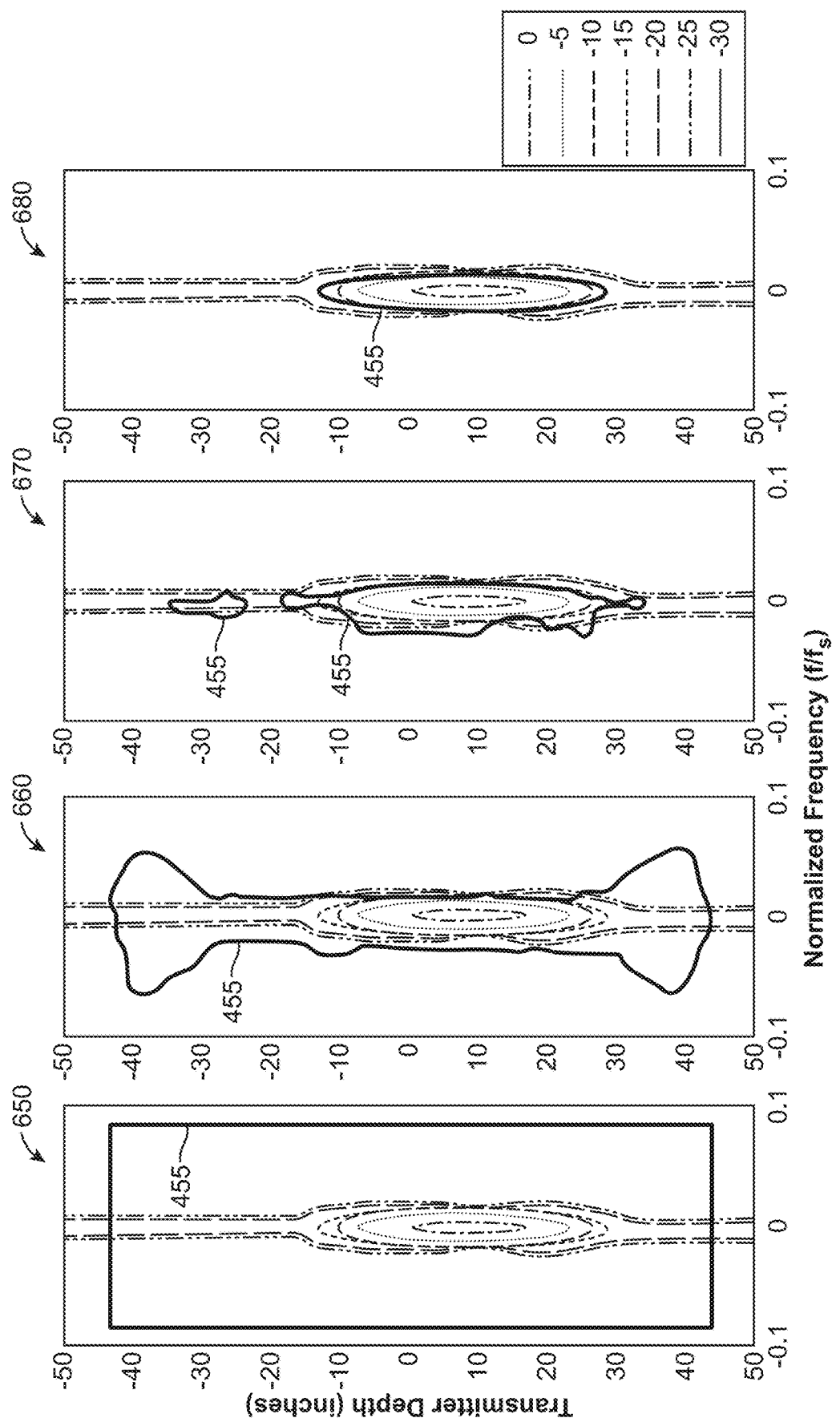
FIG. 6B is a level set contour segmentation of a pipe 330 defect of the three pipe arrangement of FIG. 4A.

The initial LSF and final LSF of an example pipe defect segmentation is shown in FIGS. 5A and 5B. FIGS. 5A and 5B illustrate the initial and final LSF segmentation of pipe defect signatures, each having a zero level set 510 contour. For the purposes of this example, the desired shape of the LSF is maintained throughout the whole evolution. Using this formulation, the LSF obtains negative values inside the contour and positive values outside the contour. However, for the purpose of visualization in this example, −ϕ has been plotted. FIGS. 6A and 6B illustrate the segmentation of different pipe defect signatures. FIGS. 6A and 6B illustrate a plurality of level set contour segmentation graphs. Specifically, the graphs in FIG. 6A represent the defect 450 of the middle pipe 420 and the graphs in FIG. 6B represent the defect 450 of the outer pipe 430.

Both FIGS. 6A and 6B start with the same initial contour, evolve inward, and eventually stop at the object's boundaries. The frequency is set at 2 Hz, the length of the defect (t) is 10 inches and the thickness is 0.3 inches, ODs [2+⅞, 4+½, 9+⅝], and the pipe permeability is set at 50. In FIG. 6A, graph 610 represents the defect 450 data of the middle pipe 420 at Iteration 0, highlighting the boundaries 455 of the defect. Additional graphs were produced, specifically graph 620 represents the boundaries 455 of the defect 450 at Iteration 20, graph 630 represents the boundaries 455 of the defect 450 at Iteration 90, and graph 640 represents the boundaries 455 of the defect 450 at the final contour. Similarly, the graphs 650, 660, 670, 680 of FIG. 6B represent the boundary 455 of the defect 450 in the outer pipe 430 at each of Iteration 0, Iteration 20, Iteration 90 and the final contour, respectively.

Figure 7A:
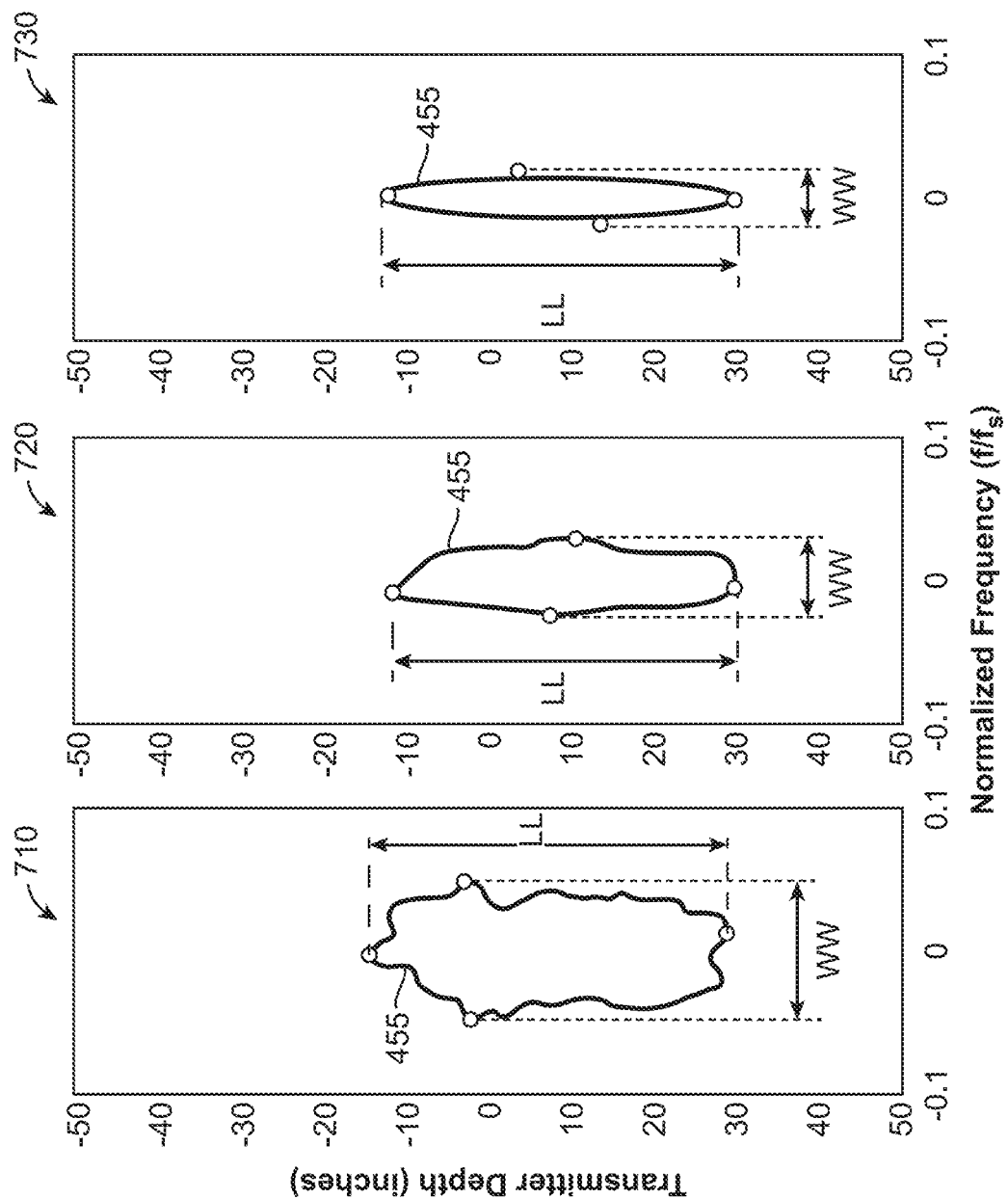
FIG. 7A is a graph showing the length and width calculations of the three pipe arrangement of FIG. 4A.
Figure 7B:
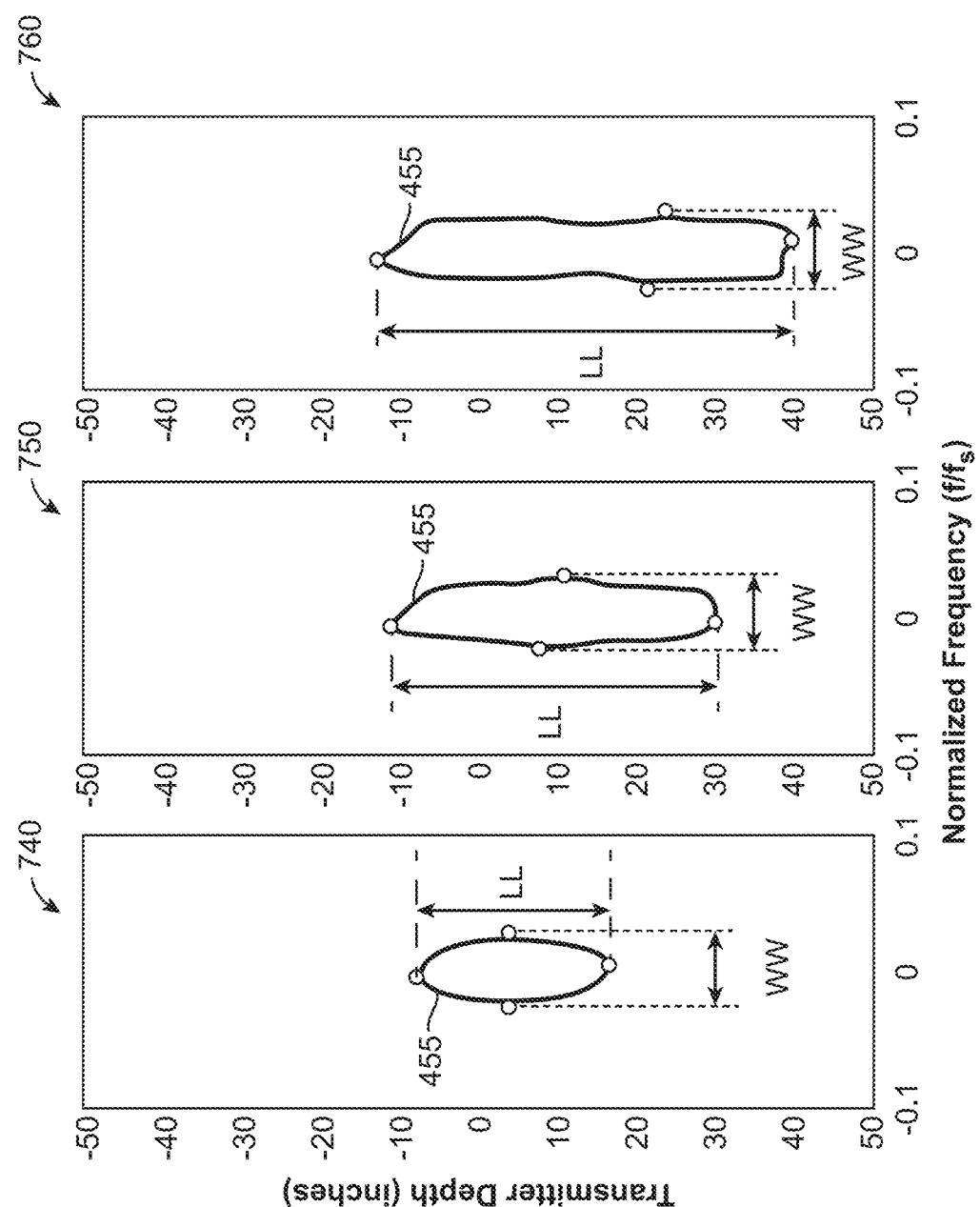
FIG. 7B is a graph showing width calculations of the three pipe arrangement of FIG. 4A.

Once the final contour of a target defect has been determined, width and length of the defect can automatically be extracted. As used in this application, "width" is defined to be the difference between the rightmost point of the contour and the leftmost point of the contour. The unit of frequency is normalized to a sampling rate of $f/f_s$. The final LSF has negative values for a region inside the contour; the width calculation can be determined by obtaining the longest consecutive negative numbers from either sides of the zero frequency axis, combining the numbers, and multiplying the numbers by the unit width between adjacent pixels. The length of the defect can be extracted by a similar method, specifically using the uppermost point and the bottommost point. FIGS. 7A and 7B illustrate the extracted width and length for the pipe defect 450 as shown in the examples of FIG. 4A.

Specifically, FIG. 7A illustrates a plurality of graphs 710, 720, 730 illustrating the boundaries 455 of a defect 450 in each of the inner pipe 410, the middle pipe 420, and the outer pipe 430, respectively. The contour width WW of each defect 450 is measured from the left most point of the defect to the rightmost, and the contour length LL of the defect 450 is measured from the topmost point to the bottommost point of the boundary 455. From FIG. 7A, it can be shown that the middle and outer pipes 420, 430 have a smaller contour width WW compared to the contour of the inner pipe 410, due to the difference in radial depth with respect to the sensor. The larger the radial depth, the less pronounced the spatial frequency contents will be, corresponding to a smaller object width in the spectrogram.

Similarly, the contour length LL can be a direct measure of the region of impact between the sensors and the defect, as shown in FIG. 7B. FIG. 7B illustrates a plurality of graphs 740, 750, 760 representing the defect 450 in the middle pipe 420 measured at different transmitter-receiver lengths. The data in graph 740 was obtained from a transmitter-receiver length (L) of 10, the data in graph 750 was obtained from an L of 20, and the data in graph 750 was obtained from an L of 30. As such, it can be shown that for a fixed defect length (t=10), a larger transmitter-receiver spacing will produce a larger contour length.

Figure 8:
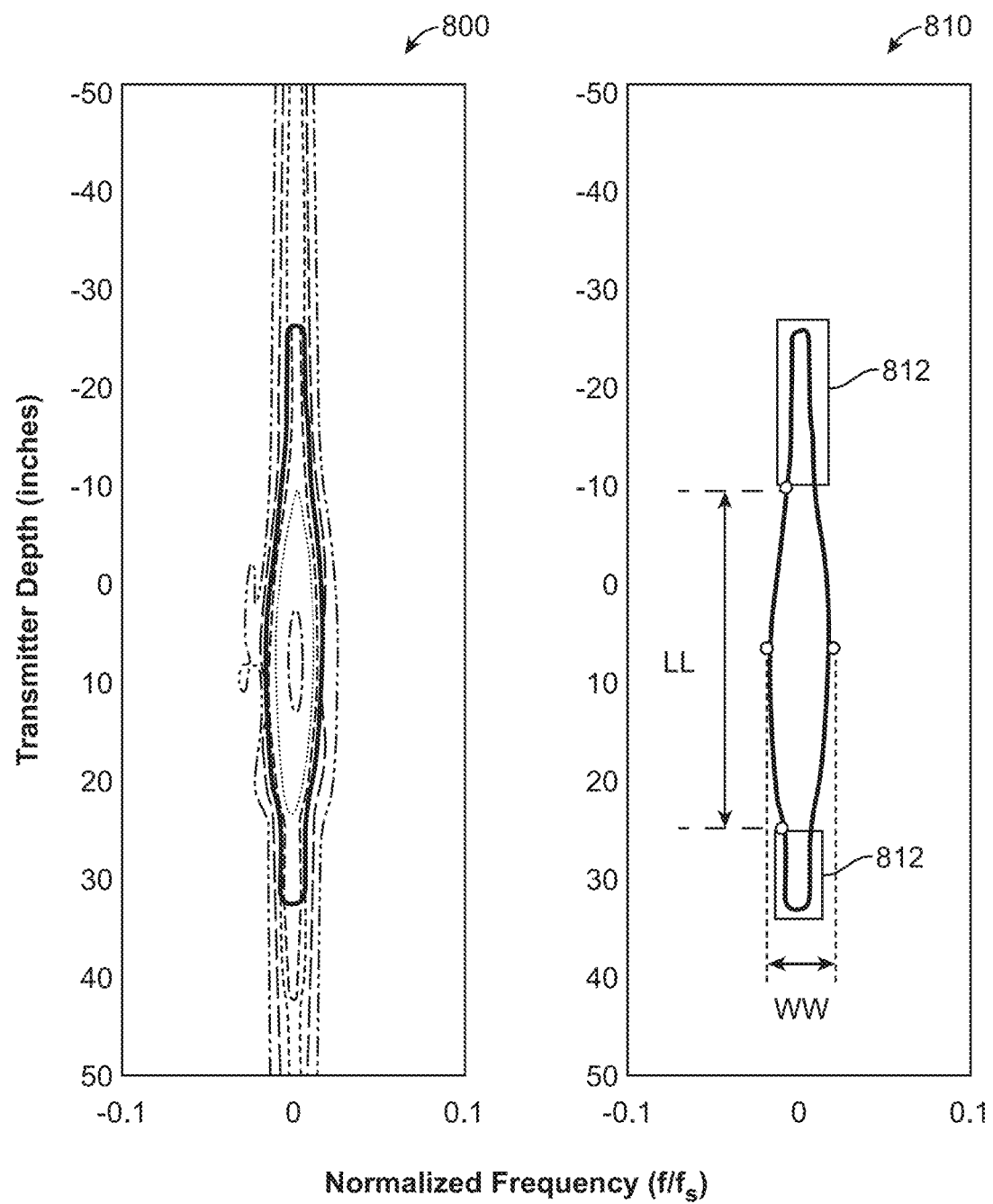
FIG. 8 is a segmentation and extraction of a pipe 830 defect of the three pipe arrangement of FIG. 4A.

Weak pipe defect signatures can occur when a pipe defect is on the middle or outer pipes 420, 430, or when the concentric pipes have a higher pipe permeability. For the purposes of this example, all spectrograms have been normalized to their maximum magnitude, making the amplitude of the subtraction error more intense on the zero frequency axis of the spectrogram, thus affecting the outcome of the contour evolution. For example, FIG. 8 illustrates the undesirable impact when the outer pipe 430 has a higher permeability. The defect 450 of FIG. 8 has a defect length of 10 inches, a permeability of 0.3 inches, the measurements are taken at a transmitter-receiver distance of 20 inches, and a pipe permeability of 100. Graph 800 of FIG. 8 shows the segmentation of the defect 450 and graph 810 shows the extraction of the contour width WW and length LL. A post-segmentation filter can be applied to allow for removal of any section 812 where the horizontal span is less than a predetermined threshold. The predetermined threshold can be selected such that the threshold is roughly equal to the width of the spectrogram mainlobe (in absence of a pipe defect), which depends on the size of DFTs and the hamming window function used to generate the spectrogram.

Figure 9:
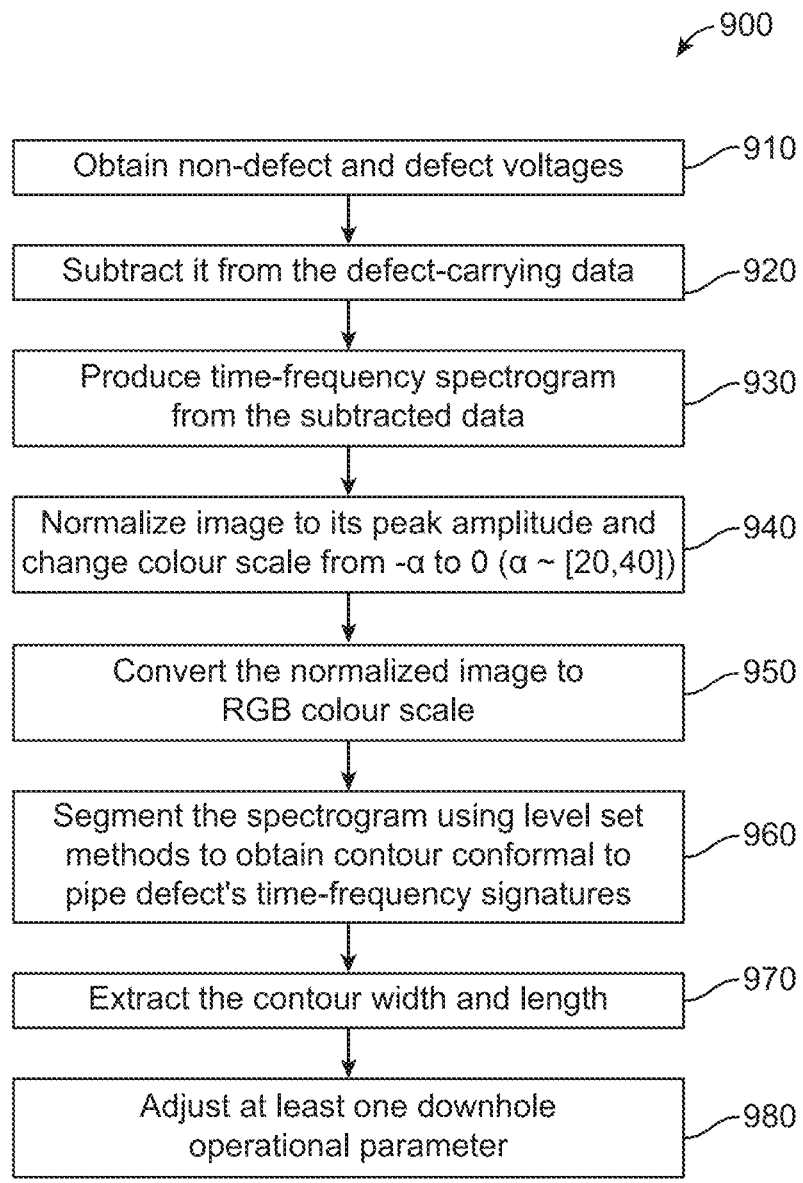
FIG. 9 is a flow diagram of a method of carrying out automated segmentation and extraction of defect information.

FIG. 9 is a flow chart illustrating a method 900 used to automatically extract the contour width WW and contour length LL of the defect. For the purposes of this example, a system operating at a low frequency for sensing through multiple pipes is used. At block 910, a stationary voltage is obtained from a database, the stationary voltage represents a pipe without any defect. Additionally, a downhole logging tool is used to obtain a voltage from the pipe being tested. The data obtained downhole can be transferred, either by wired or wireless transmission, from the downhole logging tool to the surface for analysis. At block 920, the actual voltage is subtracted from the stationary voltage. In this example, the subtraction is carried out such that the spectrogram does not get overwhelmed by the stationary contents. At block 930, a time-frequency spectrogram is produced from the subtracted data; the spectrogram can be visually presented on a display screen. At block 940 the spectrogram is normalized to its peak amplitude and change the color scale from 0 to a dB down, where a is a user choice between 20 and 40. At block 950 the spectrogram is converted to the RGB color scale in order to carry out the segmentation. In practice, the normalized images may be stored as any image file formats, including, but not limited to, TIF, JPG, PNG, and GIF. Any of the listed formats will work as long as it is converted to the RGB color scale prior to run time. At block 960, the spectrogram is segmented using level set methods to obtain a contour model that conforms to the time-frequency signatures of a pipe defect. The contour model can represent the defect in a variety of ways including, but not limited to, shape, width, height, positive sign, or negative sign. Additionally, the contour model can represent a plurality of different contours. The contour model can be displayed on the screen. At block 970 the contour width and length is extracted and can be displayed on the screen. Contour length and width are the two critical attributes containing information about a pipe defect's radial depth and size. Finally, at block 980, a downhole operational parameter can be adjusted based on the extracted contour data. A variety of operations can be affected by the stability of the environment downhole; a downhole operational parameter can be adjusted in order to maintain production despite small defects in the environment. The downhole operational parameter can be selected from the group consisting of a drilling parameter, a logging parameter, a completion parameter, a production parameter, or a combination thereof. The method can be repeated as frequently as necessary to monitor the defect.

While the method of FIG. 9 illustrates a method for determining the extent of a pipe defect, the method can be used to quantify several different downhole parameters. For example, the quantifiable downhole parameters related to a pipe can be, but are not limited to, pipe thickness, metal loss, magnetic permeability, conductivity, and defect size; and the quantifiable downhole parameters related to an earth formation can be, but are not limited to, a layered relative dip, a fracture, a bed formation, a bed position, a resistivity, and a layer position.

To carry out the proposed technique, pre-constructed databases are used to associate the contour attributes to pipe defect information (referred to also herein as inversion). For information regarding which of the concentric pipes have defects, a one-to-one look-up table is employed associating the extracted contour width with the radial depth of the defect. Once the radial depth has been determined, another database is used to map the defect to different pipe attributes in a multiple-concentric pipe scenario. Such pipe attributes can include, but are not limited to, permeability, ODs, and thicknesses, such that a given radial depth can be mapped using a combination of these attributes. In the described example, the system is underdetermined since there are usually more unknown pipe attributes than data (for example, the defect's radial depth). Consequently, more than one mapping of the attributes may be available for a given radial depth. In practice some pipe attributes, such as thickness and permeability, may be available. However, certain pipe attributes like ODs, which can be used to determine which of the pipes has a defect, are the dominating factor impacting radial depth.

A second database can be constructed by calculating the radial depths for a plurality of pipes for a plurality of ODs, and a range of permeability and thickness. During the inversion, a constrained optimization can be carried out to compare the radial depth of the defect extracted from the measurements ($R^{mes}$) with the radial depths in the database ($R^{database}$) to find the closest match. A cost function (J) can be computed based on the difference between $R^{mes}$ and $R^{database}$, as shown in Equation 6.

$$J = \arg\min_{(\tau,\mu,\rho)} \|R^{mes}(\tau,\mu,\rho) - R^{database}(\tau,\mu,\rho)\| \quad (6)$$

for all $t\epsilon(\tau_1,\tau_2)$ and $\mu\epsilon(\mu_1,\mu_2)$. Wherein $\|R^{mes}(\tau,\mu,\rho) - R^{database}(\tau,\mu,\rho)\|$ can be the 2-norm operator, $\tau$ and $\mu$ are vectors representing the thickness and permeability of each of the pipes (the values are constrained to be within standard ranges bounded by $(\tau_1,\tau_2)$ and $(\mu_1, \mu_2)$, respectively), and $\rho$ is a vector consisting of only 0 and 1 indicating the pipe containing the defect. For example, the vector $(1,0,0,0)^T$ indicates a defect on the first pipe, while $(0,0,0,1)^T$ shows a defect in the fourth pipe. Since the goal is to estimate $\rho$ (the pipe containing a defect), $\tau$ and $\mu$ can be constrained under short windows, for example, ($\tau_1 \approx \tau_2$, $\mu_1 \approx \mu_2$), for the inversion to be efficient. A similar inversion process can be used to estimate a defect size from an obtained contour length LL, extracted from the spectrograms.

Figure 10:
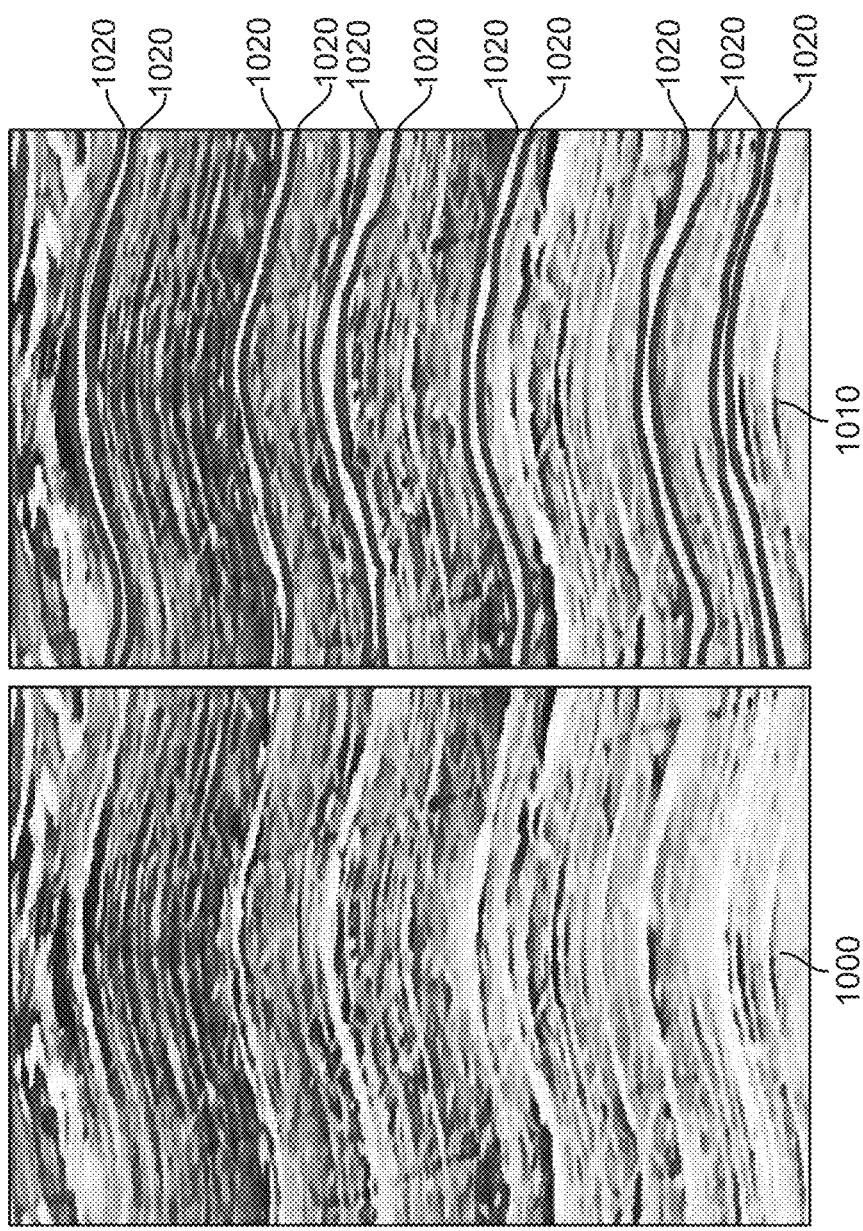
FIG. 10 is a comparison of electrical images of a borehole.

While the above example is directed to detecting pipe defects, the method as described above can be used to detect other anomalies as well, including, but not limited to, borehole structure, earth formation changes, and other subterranean features. The method could also be extended to process features of the time-depth pulsed eddy current data or the azimuthal pipe inspection data. Additionally, the method can be used to image a borehole, allowing for segment fractures and other features to be shown in both electromagnetic and acoustic images. FIG. 10 illustrates a proposed segmentation technique when used to label fractures, faults, breakouts and other fine features in an electrical image. Image 1000 shows detailed electrical images of an example borehole showing the natural and induced features, faults, formation breakout, vugs, and other fine details of the formation. Image 1010 shows the same borehole after segmentation 1020 is applied, highlighting the changes in features.

Figure 11:
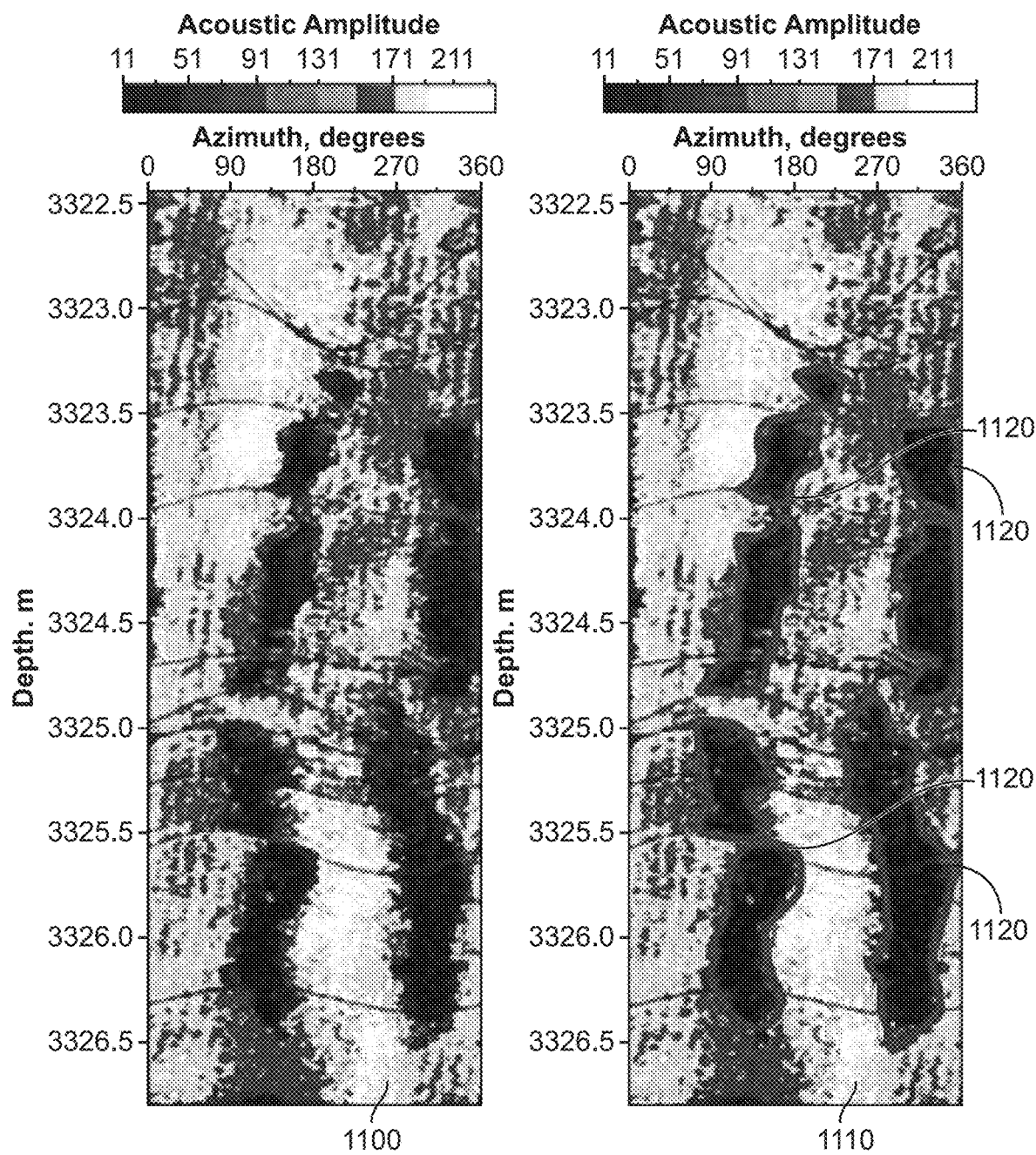
FIG. 11 is a comparison of acoustic images of a borehole.

The same technique may be applied to an acoustic image to segment breakouts, as shown by lower reflected amplitude in the images in FIG. 11. Image 1100 illustrates an example breakout detection using an ultrasonic borehole tele-viewer. Breakouts are indicated by the lower acoustic amplitude of the reflected signal, shown as the darker areas in image 1100. The breakouts are rotated because of a drilling-induced slippage of localized faults. Image 1110 shows the same acoustic image after segmentation 1120 is applied to highlight the breakouts.

Figure 12A:
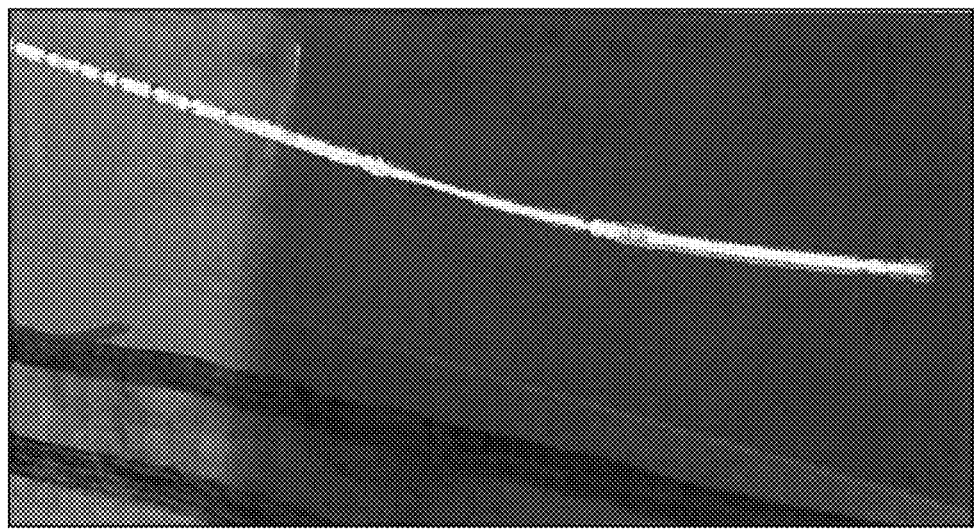
FIG. 12A is an image of an example subterranean formation.
Figure 12B:
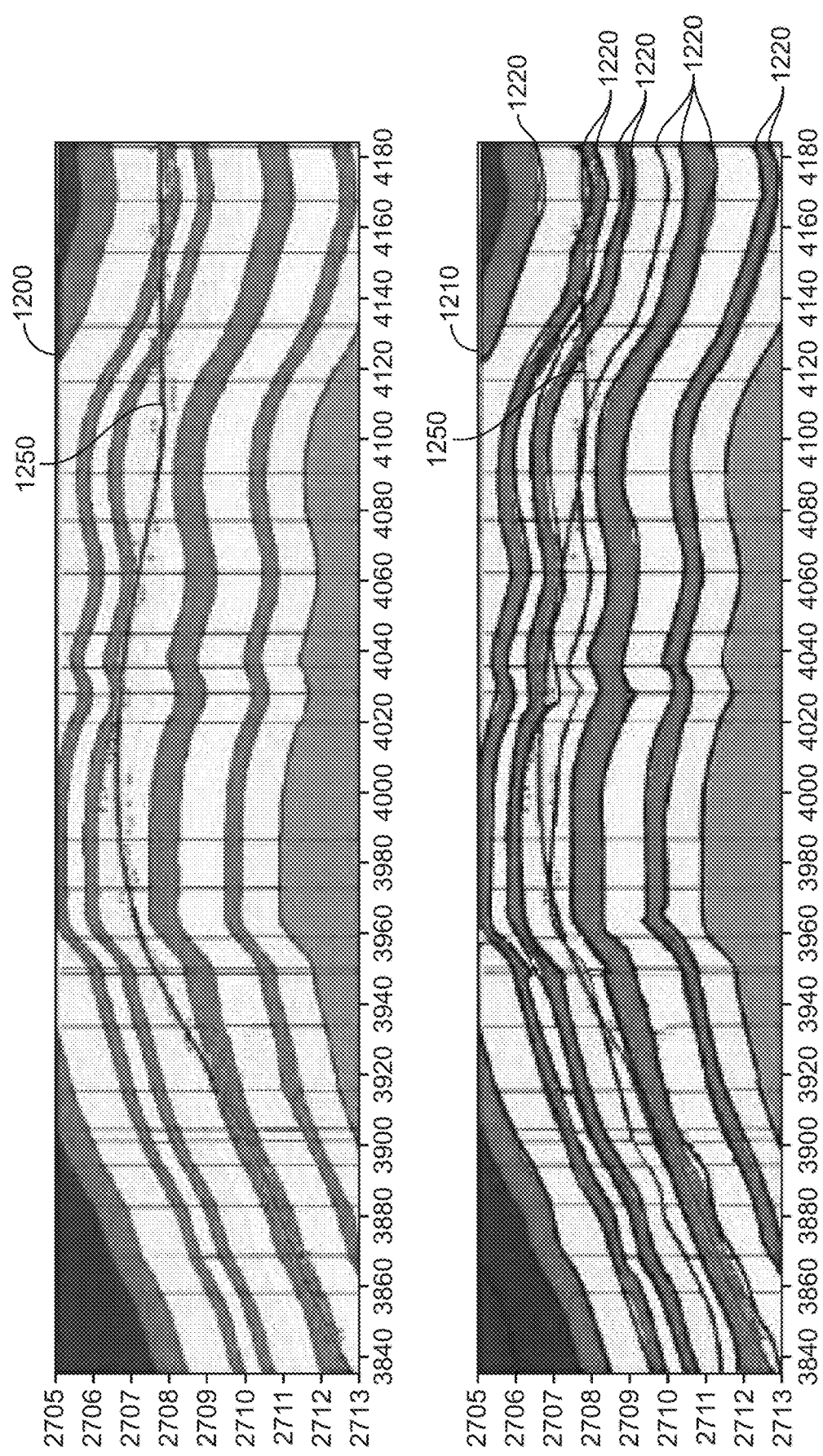
FIG. 12B is a comparison of a distance-to-bed-boundary image of a borehole.

The above described method can also be used in distance-to-bed-boundary (DTBB) applications. The method can pick up the bed boundaries to improve the accuracy of distance calculation; such results are shown in FIGS. 12A and 12B. Since the bed boundaries are often curved surfaces, the segmentation technique based on geometric active contour is a suitable fit for quantifying its geometric variation. FIG. 12A illustrates an image of a subterranean earth formation. FIG. 12B illustrates the different bed boundaries throughout the earth formation; image 1200 shows the change in beds that the drilling path 1250 will pass through. Image 1210 illustrates the same DTBB after segmentation 1220 is applied, giving the operator better clarity of which beds the drilling path 1250 will pass through and when the change will occur.

In each application discussed above, the automated segmentation/labeling of the target features is capable of capturing the exact position of special variations in a finite 2-dimensional or 3-dimensional grid. This can later be used for additional processing, including, but not limited to, formation classification, feature identification, and pattern recognition.

Numerous examples are provided herein to enhance understanding of the present disclosure. A specific set of statements are provided as follows.

Statement 1: A method for taking measurements in a wellbore comprising lowering a downhole logging tool in the wellbore; obtaining, via the logging tool, a plurality measurements of a downhole element; processing the plurality of measurements to obtain a plurality of processed measurements; calculating a contour model based on the plurality of processed measurements; and determining a parameter of the downhole element based on the contour model.

Statement 2: A method according to Statement 1, further comprising adjusting at least one downhole operational parameter based on the downhole parameter.

Statement 3: A method according to Statement 1 or Statement 2, further comprising creating a visual representation based on the downhole parameter.

Statement 4: A method according to Statements 1-3, wherein the plurality of processed measurements are selected from the group consisting of a depth-frequency domain; a time-frequency domain; a borehole azimuth-depth domain; and a depth-time domain.

Statement 5: A method according to Statements 1-4, wherein processing the plurality of measurements comprises subtracting non-defected signal from an actual signal.

Statement 6: A method according to Statements 1-5, comprising generating a visualization of the plurality of processed measurements in a spectrogram.

Statement 7: A method according to Statements 1-6, wherein the contour model is selected from the group consisting of a contour shape, width, height, positive sign, negative sign, and a combination thereof.

Statement 8: A method according to Statements 1-7, wherein the contour model represents a plurality contours.

Statement 9: A method according to Statements 1-8, further comprising generating a visualization of the contour model.

Statement 10: A method according to Statements 1-9, wherein the calculating the contour model comprises applying a level set function.

Statement 11: A method according to Statements 1-10, wherein the downhole element is selected from the group consisting of a pipe, a borehole, a formation, and a combination thereof.

Statement 12: A method according to Statements 1-11, wherein the operational parameter is selected from the group consisting of a drilling parameter, a logging parameter, a completion parameter, a production parameter, and a combination thereof.

Statement 13: A method according to Statements 1-12, wherein the downhole element is a pipe.

Statement 14: A method according to Statements 1-13, wherein the parameter of the pipe is selected from selected from the group consisting of pipe thickness, metal loss, magnetic permeability, conductivity, defect, and a combination thereof.

Statement 15: A method according to Statements 1-13, wherein the parameter of the pipe is defect and a visualization of the defect is reproduced on a display screen.

Statement 16: A method according to Statements 1-15, wherein the downhole element is a formation.

Statement 17: A method according to Statements 1-16, wherein the parameter of the formation is selected from the group consisting of a layered relative dip, a presence of fractures, a layer position, a resistivity, and a combination thereof.

Statement 18: A method according to Statements 1-17, further comprising comparing the plurality of processed measurements or the calculated contour to a database of modeled measurements and adjusting the downhole operational parameter based on a best match of the processed measurement or calculated contour to at least one of the modeled measurements in the database of modeled measurements.

Statement 19: A method according to Statements 1-18, further comprising iteratively calculating the contour model.

Statement 20: A downhole logging tool comprising a measuring device for making measurements of a downhole element; a computer-readable storage device having stored therein instructions which, when executed by the processor, cause the processor to perform operations comprising receiving a plurality measurements of a downhole element from the measuring device, processing the plurality of measurements to obtain a plurality of processed measurements, calculating a contour model based on the plurality of processed measurements, determining a parameter of the downhole element based on the contour model.

Statement 21: A downhole logging tool according to Statement 20, wherein the downhole element is a pipe, and the parameter of the pipe is selected from selected from the group consisting of pipe thickness, metal loss, magnetic permeability, conductivity, defect, and a combination thereof.

Statement 22: A downhole logging tool according to Statement 20 or Statement 21, wherein the operations include transmission of the parameter to the surface for representation of the defect on a display screen.

Statement 23: A system comprising a downhole logging tool disposed within a wellbore; and a server communicatively coupled with the downhole logging tool, the server having a processor and a memory, the memory storing instructions which, when executed cause the processor to receiving a plurality measurements of a downhole element from the measuring device, processing the plurality of measurements to obtain a plurality of processed measurements, calculating a contour model based on the plurality of processed measurements, determining a parameter of the downhole element based on the contour model.

Statement 24: A system according to Statement 23, wherein the downhole element is a pipe, and the parameter of the pipe is selected from selected from the group consisting of pipe thickness, metal loss, magnetic permeability, conductivity, defect, and a combination thereof.

Statement 25: A system according to Statement 23 or Statement 24, wherein the representation of the defect is reproduced on a display screen.

Statement 26: A method comprising obtaining a plurality of measurements using a logging tool disposed in a wellbore; computing processed measurements from the plurality of measurements; calculating a contour model based on the processed measurements; calculating one of a pipe, borehole, or formation parameter based on the calculated contour model; altering at least one of a drilling, logging, completion, or production parameter based on the calculated pipe, borehole, or formation parameter.

Statement 27: A method according to Statement 26, further comprising comparing the calculated pipe, borehole, or formation parameter to a table of modeled process measurements or contour models to obtain a best match, and altering at least one of a drilling, logging, completion, or production parameter based on the beset match.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed:

1. A method for taking measurements in a wellbore comprising:
    conducting a downhole operation having at least one downhole operational parameter, wherein the at least one downhole operational parameter includes a drilling parameter, a logging parameter, a completion parameter, a production parameter, or a combination thereof;
    lowering a downhole logging tool in the wellbore, the downhole logging tool including an electromagnetic logging tool;
    obtaining, via the electromagnetic logging tool, a plurality measurements of a downhole element, the downhole element including a plurality of concentric downhole elements, wherein each of the plurality of concentric downhole elements includes a pipe;
    processing the plurality of measurements to obtain a plurality of processed measurements;
    generating a contour model based on the plurality of processed measurements, wherein the contour model includes a contour shape and a contour length associated with one or more attributes relevant to the plurality of concentric downhole elements;
    generating a visualization of the contour model;
    determining a downhole parameter of the concentric downhole elements based on the contour model and a radial inversion, the downhole parameter including a three-dimensional defect shape across the plurality of concentric downhole elements, wherein the radial inversion determines a radial depth of the three-dimensional defect shape and the contour model determines the contour shape and the contour length of the three-dimensional defect shape; and adjusting the at least one downhole operational parameter based on the downhole parameter.

2. The method of claim 1, further comprising creating a visual representation based on the downhole parameter.

3. The method of claim 1, wherein the plurality of processed measurements include a depth-frequency domain; a time-frequency domain; a borehole azimuth-depth domain; and/or a depth-time domain.

4. The method of claim 1, wherein processing the plurality of measurements comprises subtracting a direct signal and/or a non-defected signal from a total signal.

5. The method of claim 1, further comprising generating a visualization of the plurality of processed measurements in a spectrogram.

6. The method of claim 1, wherein the contour model includes a contour width.

7. The method of claim 1, wherein calculating the contour model comprises applying a level set function.

8. The method of claim 1, wherein the downhole element includes a pipe, a borehole, a formation, and/or a combination thereof.

9. The method of claim 1, wherein the downhole parameter includes a pipe thickness, a metal loss, a magnetic permeability, a conductivity, a defect, or a combination thereof.

10. The method of claim 1, wherein the downhole parameter of the pipe is defect, and a visualization of the defect is reproduced on a display screen.

11. A downhole logging tool comprising:
a measuring device for making measurements of a downhole element, wherein the measuring device includes an electromagnetic logging tool, wherein the downhole element includes a plurality of concentric downhole elements, wherein each of the plurality of concentric downhole elements includes a pipe;
a computer-readable storage device having stored therein instructions which, when executed by the processor, cause the processor to perform operations comprising:
receiving a plurality measurements of the plurality of concentric downhole elements from the electromagnetic logging tool,
processing the plurality of measurements to obtain a plurality of processed measurements,
generating a contour model based on the plurality of processed measurements, wherein the contour model includes a contour shape and a contour length associated with one or more attributes relevant to the plurality of concentric downhole elements,
generating a visualization of the contour model,
determining a parameter of the plurality of concentric downhole elements based on the contour model and a radial inversion, the parameter including a three-dimensional defect shape across the plurality of concentric downhole elements, wherein the radial inversion determines a radial depth of the three-dimensional defect shape and the contour model determines the contour shape and the contour length of the three-dimensional defect shape, and
adjusting at least one downhole operational parameter based on the parameter of the plurality of concentric downhole elements.

12. The downhole logging tool of claim 11, wherein
the parameter includes a pipe thickness, a metal loss, a magnetic permeability, a conductivity, a defect, or a combination thereof.

13. The downhole logging tool of claim 11, wherein the operations include transmission of the parameter of the concentric downhole elements to a surface for representation of the defect on a display screen.

14. A system comprising:
a downhole logging tool disposed within a wellbore, wherein the downhole logging tool includes an electromagnetic logging tool; and
a server communicatively coupled with the downhole logging tool, the server having a processor and a memory, the memory storing instructions which, when executed cause the processor to:
receiving a plurality measurements of a downhole element from the electromagnetic logging tool, wherein the downhole element includes a plurality of concentric downhole elements, wherein each of the plurality of concentric downhole elements includes a pipe,
processing the plurality of measurements to obtain a plurality of processed measurements,
generating a contour model based on the plurality of processed measurements, wherein the contour model includes a contour shape and a contour length associated with one or more attributes relevant to the plurality of concentric downhole elements,
generating a visualization of the contour model,
determining a parameter of the plurality of concentric downhole elements based on the contour model and a radial inversion, the parameter including a three-dimensional defect shape across the plurality of concentric downhole elements, wherein the radial inversion determines a radial depth of the three-dimensional defect shape and the contour model determines the contour shape and the contour length of the three-dimensional defect shape, and
adjusting at least one downhole operational parameter based on the parameter of the plurality of concentric downhole elements.

15. The system of claim 14, wherein
the parameter includes pipe thickness, metal loss, magnetic permeability, conductivity, defect, or a combination thereof.

* * * * *